(12) United States Patent
Johnson et al.

(10) Patent No.: US 12,327,252 B2
(45) Date of Patent: Jun. 10, 2025

(54) UTILIZING CARD MOVEMENT DATA TO IDENTIFY FRAUDULENT TRANSACTIONS

(71) Applicant: Capital One Services, LLC, McLean, VA (US)

(72) Inventors: Molly Johnson, Alexandria, VA (US); Adam Vukich, Springfield, VA (US); James Zarakas, Centreville, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 18/610,842

(22) Filed: Mar. 20, 2024

(65) Prior Publication Data

US 2024/0232894 A1 Jul. 11, 2024

Related U.S. Application Data

(60) Continuation of application No. 18/052,235, filed on Nov. 3, 2022, now Pat. No. 11,961,086, which is a division of application No. 16/947,358, filed on Jul. 29, 2020, now Pat. No. 11,501,303.

(51) Int. Cl.
*G06Q 20/40* (2012.01)
*G06Q 20/38* (2012.01)

(52) U.S. Cl.
CPC ..... *G06Q 20/4016* (2013.01); *G06Q 20/3821* (2013.01)

(58) Field of Classification Search
None
See application file for complete search history.

(56) References Cited

U.S. PATENT DOCUMENTS

| 7,953,671 | B2 | 5/2011 | Bishop et al. | |
| 9,613,357 | B2 | 4/2017 | Kim | |
| 11,501,303 | B2 | 11/2022 | Johnson et al. | |
| 11,961,086 | B2 * | 4/2024 | Johnson | G06Q 20/3821 |
| 2014/0263627 | A1 * | 9/2014 | Wyatt | G06Q 20/4012 |
| | | | | 235/380 |

FOREIGN PATENT DOCUMENTS

| AU | 2005270228 B2 | 12/2008 |
| WO | 2014107325 A1 | 7/2014 |

* cited by examiner

*Primary Examiner* — Scott S Trotter
*Assistant Examiner* — Amit Patel
(74) *Attorney, Agent, or Firm* — Harrity & Harrity, LLP

(57) ABSTRACT

A fraud detection platform may receive transaction data relating to a transaction conducted by a user with a transaction card. The fraud detection platform may receive, from a biometric sensor of the transaction card, biometric data relating to one or more biometric characteristics of the user during the transaction. The fraud detection platform may receive, from an accelerometer of the transaction card, card movement data relating to a measure of shaking of the transaction card by the user during the transaction. The fraud detection platform may process the transaction data, the biometric data, and the card movement data, with a fraud detection model, to determine a fraud score associated with the transaction. The fraud detection platform may perform one or more actions based on the fraud score.

20 Claims, 13 Drawing Sheets

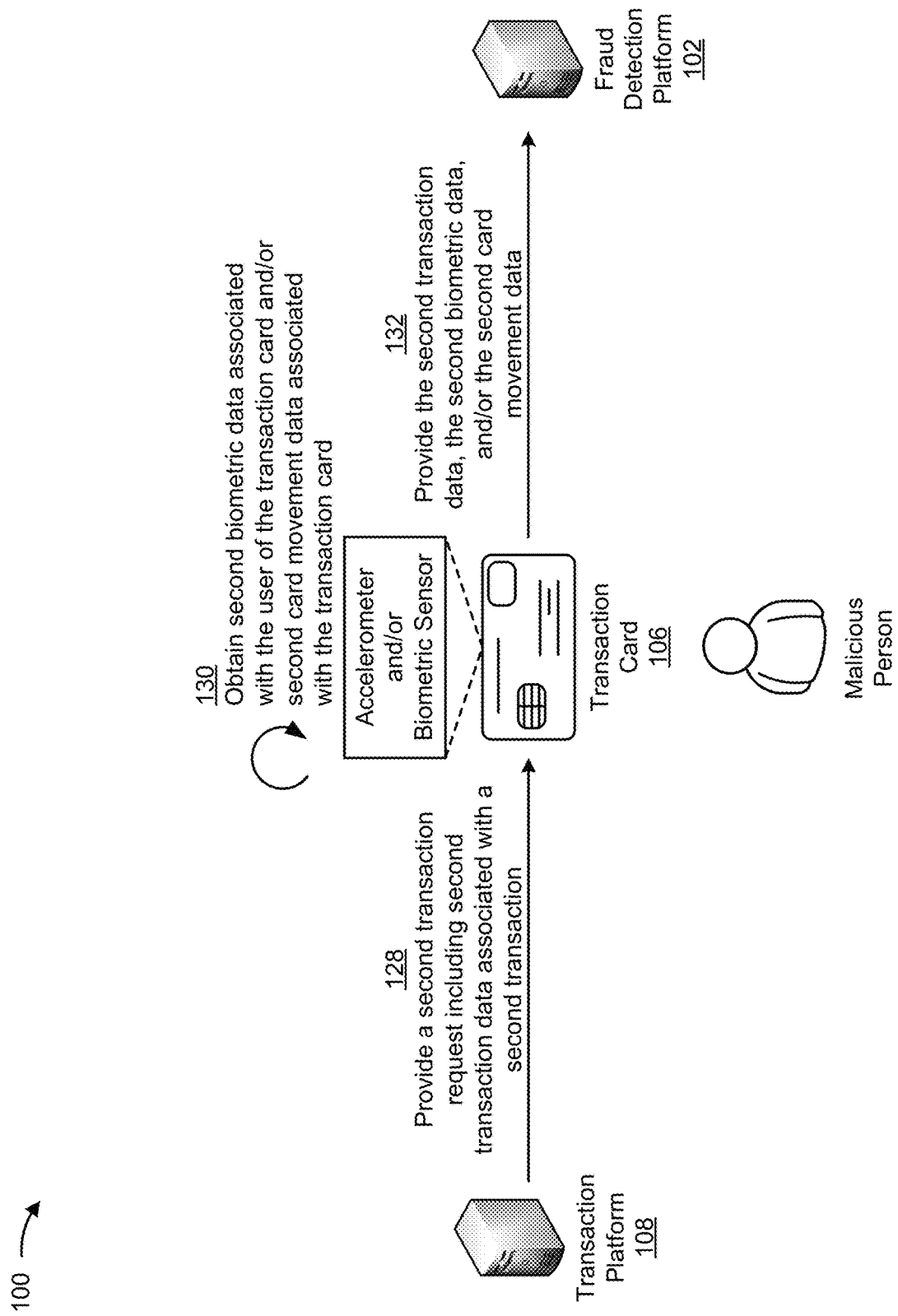

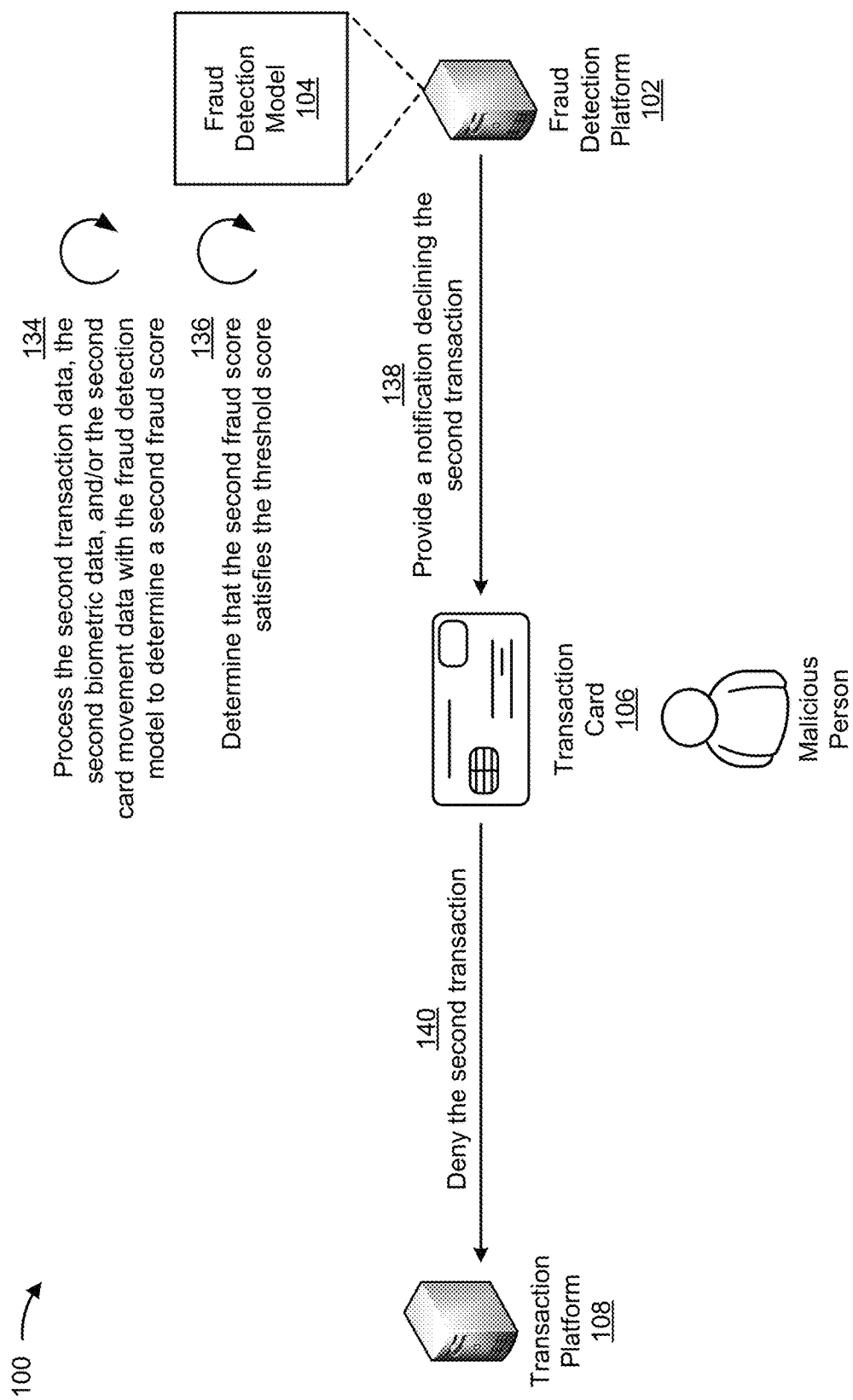

UTILIZING CARD MOVEMENT DATA TO IDENTIFY FRAUDULENT TRANSACTIONS

RELATED APPLICATION

This application is a continuation of U.S. patent application Ser. No. 18/052,235, filed Nov. 3, 2022, which is division of U.S. patent application Ser. No. 16/947,358, filed Jul. 29, 2020 (now U.S. Pat. No. 11,501,303), which are incorporated herein by reference in their entireties.

BACKGROUND

A transaction card (e.g., a credit card, a debit card, an automated teller machine (ATM) card, and/or the like) may be used in a transaction to pay for a product or service at a transaction terminal (e.g., point of sale (PoS) terminal), to withdraw money from an ATM, and/or the like. A financial institution associated with the transaction card may utilize one or more fraud detection measures to improve security with respect to use of the transaction card.

SUMMARY

In some implementations, a method may include obtaining, by a device, a fraud detection model that has been trained with historical transaction data relating to transactions conducted by a user with a transaction card, historical biometric data relating to one or more biometric characteristics that relate to a measure of nervousness of a user, and historical card movement data relating to a measure of shaking of the transaction card that relates to the measure of nervousness of the user, wherein the fraud detection model has been trained to identify which items of the historical transaction data, the historical biometric data, and the historical card movement data are indicative of fraudulent activity; receiving, by the device, transaction data relating to a transaction conducted by the user with the transaction card; receiving, by the device and from a biometric sensor of the transaction card, biometric data relating to the one or more biometric characteristics of the user during the transaction; receiving, by the device and from an accelerometer of the transaction card, card movement data relating to the measure of shaking of the transaction card by the user during the transaction; processing, by the device, the transaction data, the biometric data, and the card movement data, with the fraud detection model, to determine a fraud score associated with the transaction; and performing, by the device, one or more actions based on the fraud score.

In some implementations, a device may include one or more memories and one or more processors. The one or more processors may be communicatively coupled to the one or more memories. The one or more processors may be configured to: obtain a fraud detection model that has been trained with historical transaction data relating to transactions conducted by a user with a transaction card, historical biometric data relating to one or more biometric characteristics that relate to a measure of nervousness of the user, and historical card movement data relating to a measure of shaking of the transaction card that relates to the measure of nervousness of the user; receive transaction data relating to a transaction conducted by the user with the transaction card; receive, from the transaction card, biometric data relating to the one or more biometric characteristics of the user during the transaction; receive, from the transaction card, card movement data relating to the measure of shaking of the transaction card by the user during the transaction; process the transaction data, the biometric data, and the card movement data, with the fraud detection model, to determine a fraud score associated with the transaction; and perform one or more actions based on the fraud score.

In some implementations, a non-transitory computer-readable medium may store one or more instructions. The one or more instructions, when executed by one or more processors of a device, may cause the one or more processors to: receive transaction data relating to a transaction conducted by a user with a transaction card; receive, from the transaction card, a first set of nervousness data relating to a measure of nervousness of the user during the transaction; receive, from the transaction card, a second set of nervousness data relating to the measure of nervousness of the user during the transaction; process the transaction data, the first set of nervousness data, and the second set of nervousness data, with a fraud detection model, to calculate a fraud score associated with the transaction; and perform one or more actions based on the fraud score, wherein the one or more actions comprise: providing, to the transaction card, a notification authorizing the transaction when the fraud score fails to satisfy a threshold score, providing, to the transaction card, a notification declining the transaction when the fraud score satisfies the threshold score, providing, to a client device of the user, a notification when the fraud score satisfies the threshold score, providing the fraud score to a financial institution associated with the transaction card when the fraud score satisfies a threshold score, causing law enforcement to be dispatched to a location of the user when the fraud score satisfies the threshold score, or retrain the fraud detection model based on the fraud score.

BRIEF DESCRIPTION OF THE DRAWINGS

FIGS. 1A-1G are diagrams of one or more example implementations described herein.

DETAILED DESCRIPTION

Figure 1A:
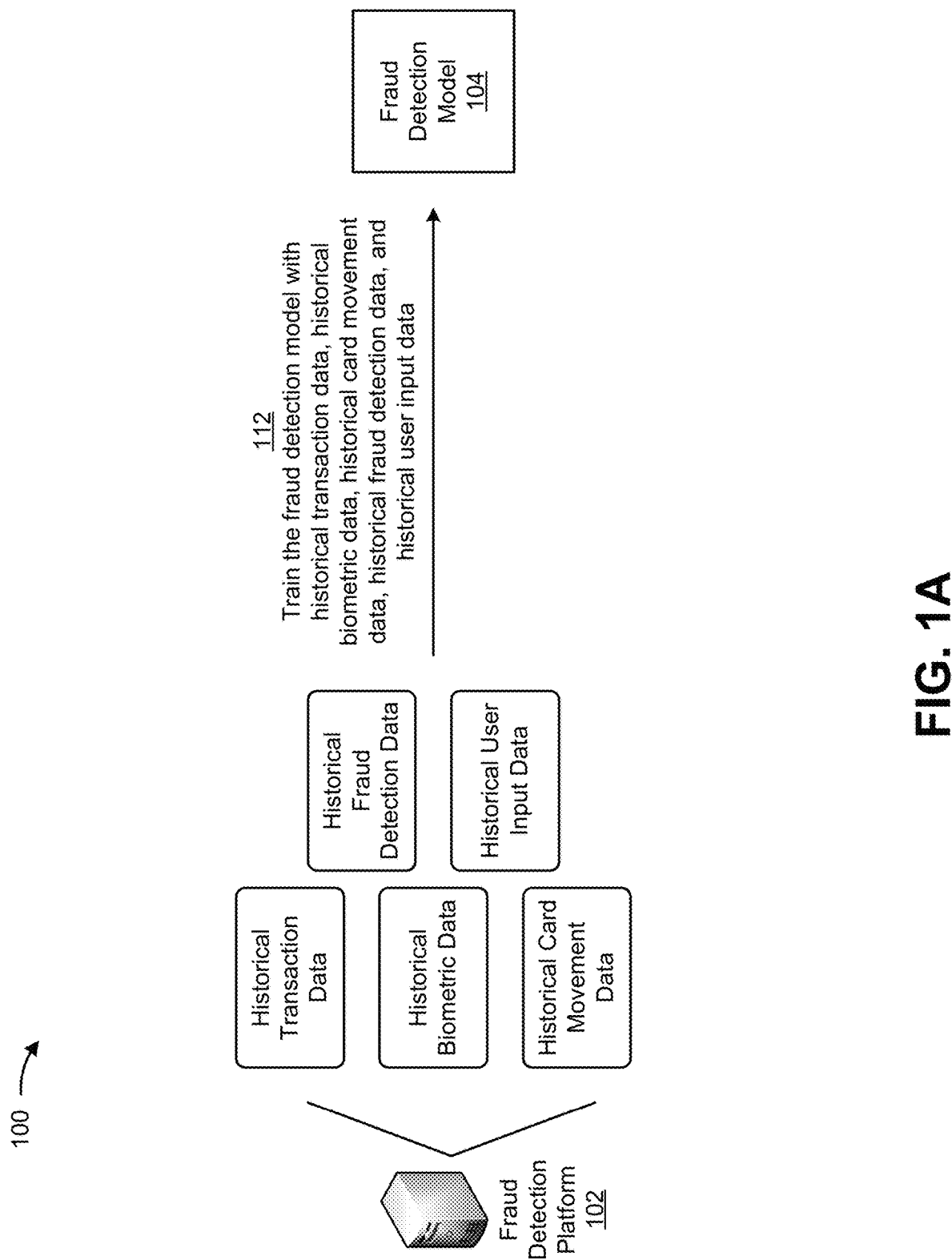

The following detailed description of example implementations refers to the accompanying drawings. The same reference numbers in different drawings may identify the same or similar elements.

A user may have a transaction card (e.g., a credit card, a debit card, an automated teller machine (ATM) card, and/or the like) that is associated with a transaction account of the user (e.g., a credit card account, a bank account, and/or the like). The user may use the transaction card (e.g., instead of cash, in addition to cash, and/or the like) to conduct transactions. For example, the user may use the transaction card to purchase one or more products and/or services from a business. In such an example, the user may present the transaction card at a transaction terminal associated with a transaction platform. The transaction platform may process information associated with the transaction card to transfer money from the transaction account of the user to a transaction account of the business. In another example, the user may use the transaction card to withdraw cash from an ATM. In such an example, the user may insert the transaction card into the ATM, enter an associated personal identification number (PIN), and request an amount of money to be withdrawn. In response, the ATM may deduct the amount of money from the transaction account of the user and provide the amount of money, in cash, to the user.

While the transaction card may be a source of convenience for the user, the transaction card may also be susceptible to fraud. For example, a malicious person may obtain the transaction card from the user (e.g., by stealing the transaction card from the user, and/or the like). In such an example, the malicious person may attempt to use the transaction card to purchase one or more products and/or services, withdraw money from an ATM, and/or the like. As another example, a malicious person may obtain transaction card information associated with the transaction card (e.g., a credit card number, a debit card number, an expiration date associated with the credit card number or the debit card number, a card verification value (CVV) associated with the credit card number or the debit card number, and/or the like). In such an example, the malicious person may attempt to use the transaction card information to purchase one or more products and/or services via the internet, a telephone call, and/or the like. As a further example, a malicious person may obtain access to the transaction account by placing the user under duress. In such an example, the malicious person may threaten the user to use the transaction card to purchase one or more products and/or services desired by the malicious person, withdraw money from an ATM for the malicious person, and/or the like.

To prevent fraud of this nature, a financial institution associated with the transaction card may utilize one or more fraud detection measures. However, even with the one or more fraud detection measures, the financial institution may struggle to accurately identify and prevent fraud. For example, the financial institution, based on the one or more fraud detection measures, may improperly indicate whether a transaction is fraudulent. In this example, the financial institution may waste computing resources (e.g., processor, memory, or communication resources) and/or network resources to provide reports of fraud to one or more devices, provide alerts of incidents of fraud to one or more devices, preventing a valid transaction, and/or the like. A user associated with the transaction card may in turn, waste computing and/or network resources correcting the reports of fraud, repeating the transaction, and/or the like. As another example, the financial institution may fail to recognize that a transaction is fraudulent. In this example, a user associated with the transaction card may waste computing and/or network resources notifying the financial institution of the fraud, and/or the like. The financial institution, in turn, may waste computing and/or network resources to provide reimbursements and/or notifications of reimbursements to one or more devices, cancelling the transaction card, issuing and providing a new transaction card to the user, and/or the like.

Some implementations described herein provide a device (e.g., a fraud detection platform, and/or the like) that utilizes card movement data to identify and prevent fraudulent transactions. The device may obtain a fraud detection model that has been trained with historical transaction data relating to transactions conducted by a user with a transaction card, historical biometric data relating to one or more biometric characteristics that relate to a measure of nervousness of the user, and historical movement data relating to a measure of shaking of the transaction card that relates to the measure of nervousness of the user. The device may receive transaction data relating to a transaction conducted by the user with the transaction card. The device may receive, from a biometric sensor of the transaction card, biometric data relating to the one or more biometric characteristics of the user during the transaction. The device may receive, from an accelerometer of the transaction card, card movement data relating to the measure of shaking of the transaction card by the user during the transaction. The device may process the transaction data, the biometric data, and the card movement data, with the fraud detection model, to determine a fraud score associated with the transaction. The device may perform one or more actions based on the fraud score.

By utilizing card movement data to assess whether a transaction is fraudulent, a financial institution associated with a transaction card may be better equipped to identify and prevent fraud. As such, the financial institution may conserve computing and/or network resources that might otherwise have been consumed providing inaccurate reports of fraud to one or more devices, providing inaccurate alerts of incidents of fraud to one or more devices, preventing valid transactions, providing reimbursements and/or notifications of reimbursements to one or more devices, cancelling the transaction card, issuing and providing one or more new transaction cards, and/or the like. A user associated with the transaction card may in turn, conserve computing and/or network resources that might otherwise have been consumed correcting inaccurate reports of fraud, repeating a transaction that was improperly indicated as fraud, notifying the financial institution that the transaction was fraudulent, and/or the like.

Figure 1B:
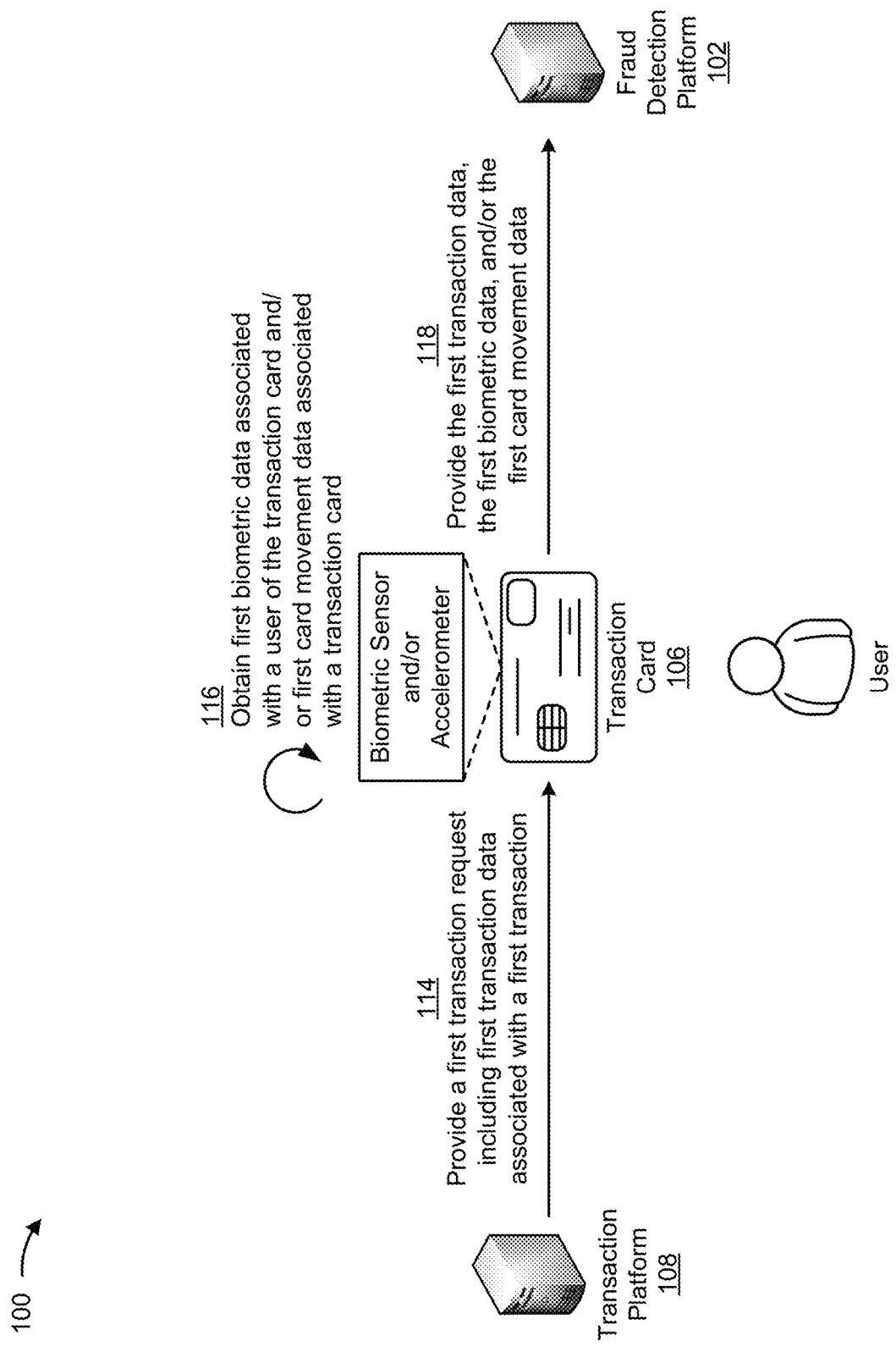
Figure 1C:
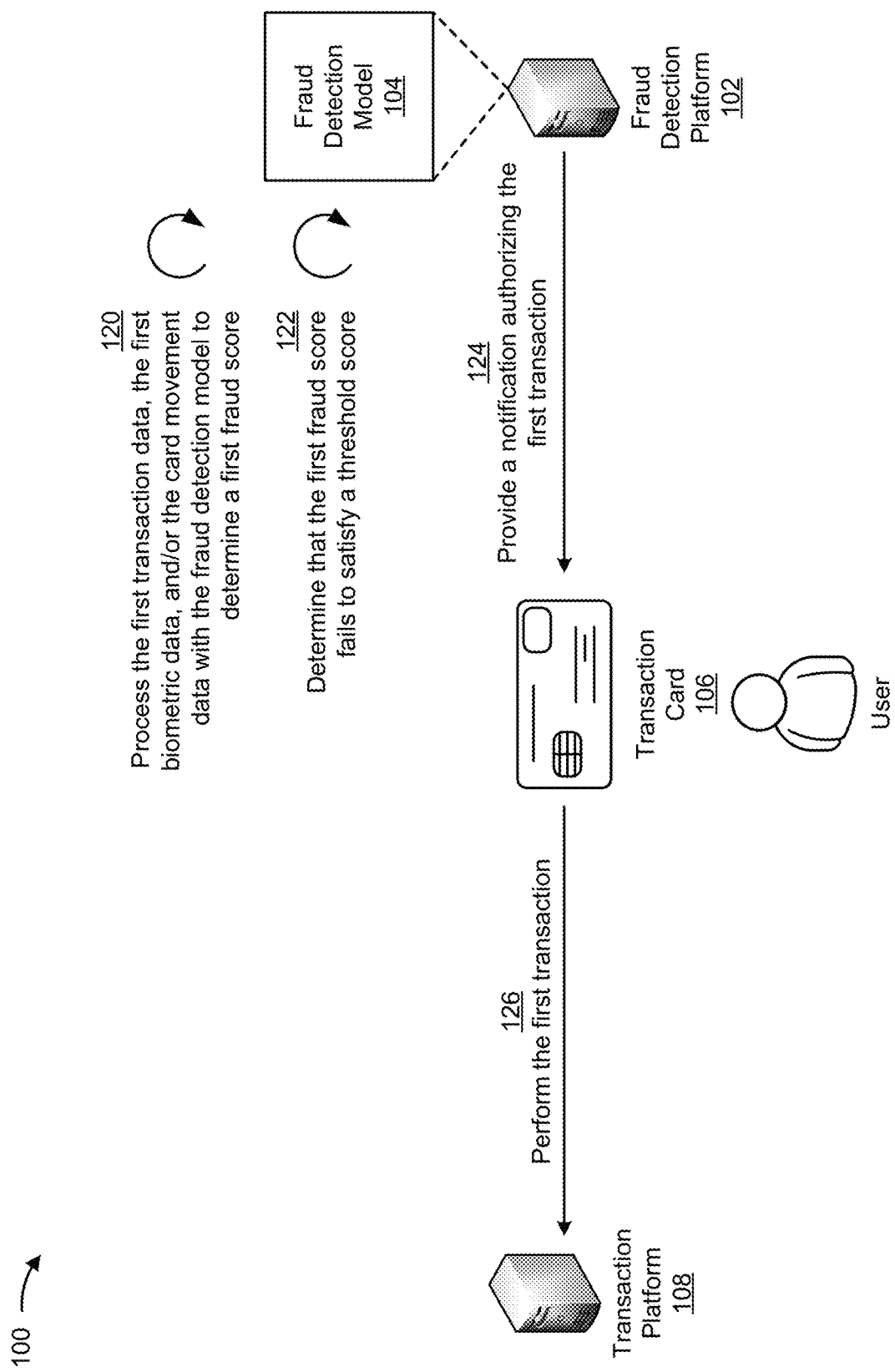
Figure 1F:
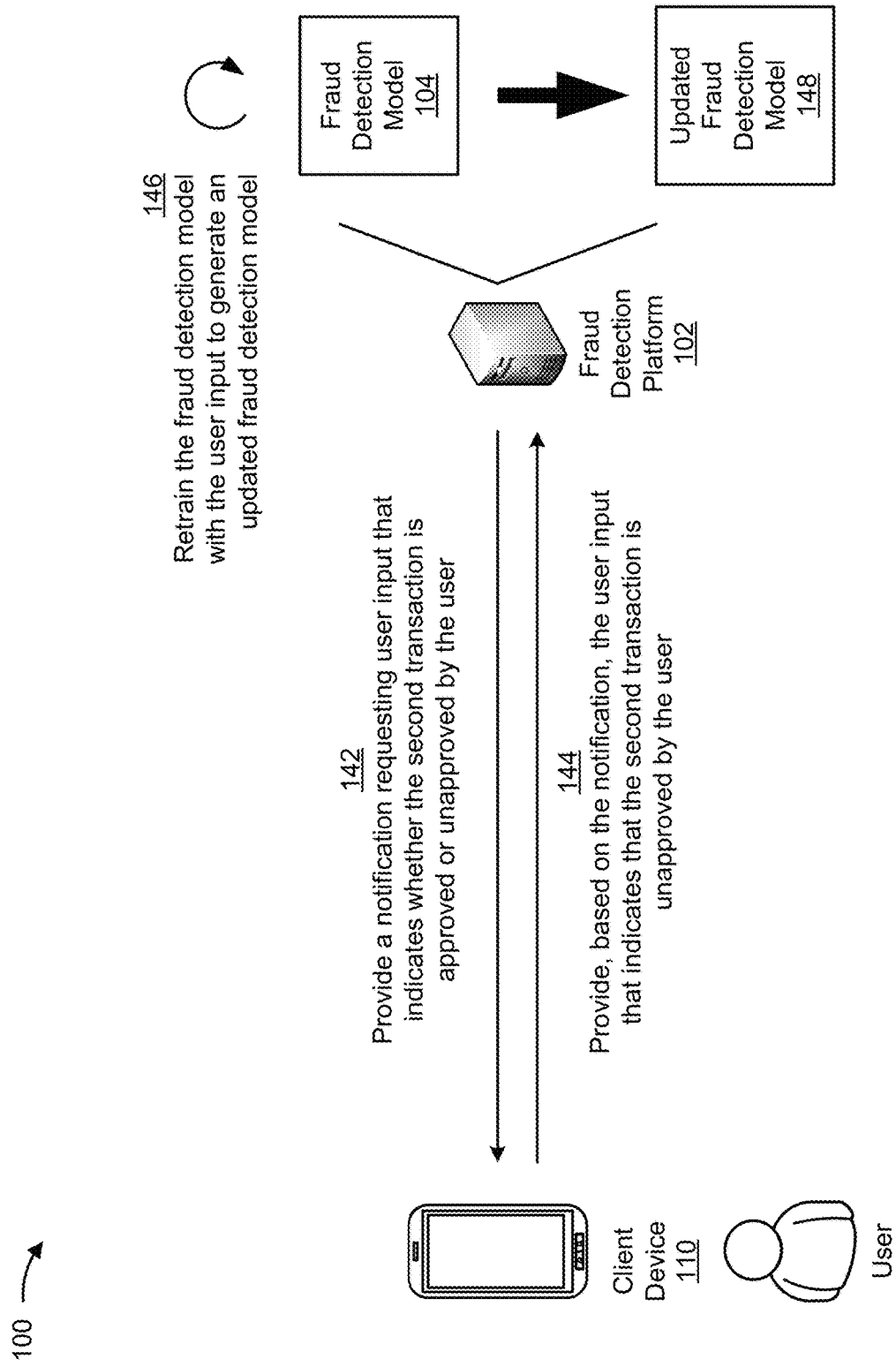
Figure 1G:
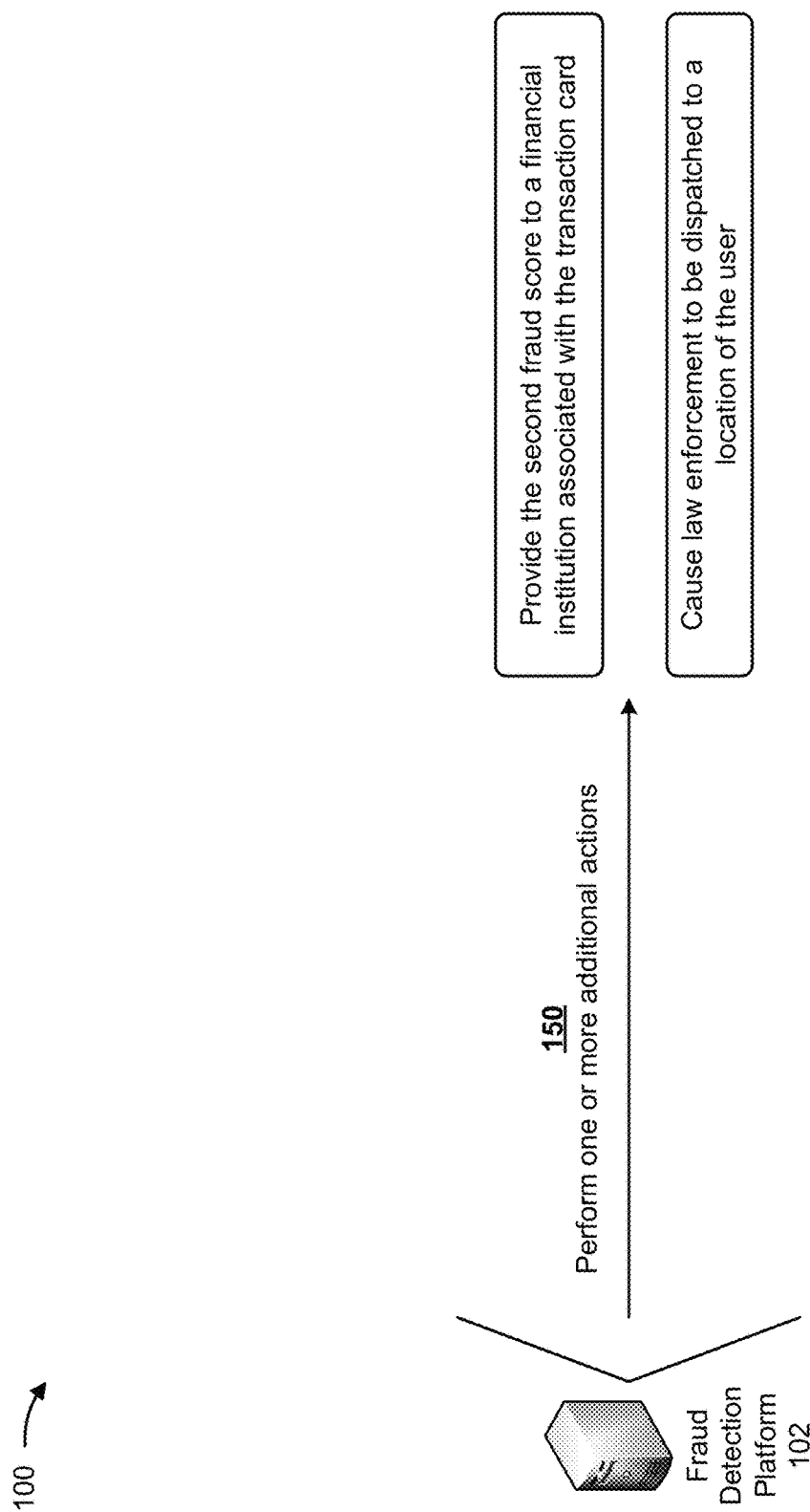

FIGS. 1A-1G are diagrams of one or more example implementations 100 described herein. FIG. 1A illustrate a fraud detection platform 102 training a fraud detection model 104 to identify whether a transaction is fraudulent. FIGS. 1B-1C illustrate the fraud detection platform 102 permitting a user to utilize a transaction card 106 to conduct a first transaction via a transaction platform 108. FIGS. 1D-1E illustrate the fraud detection platform 102 preventing a malicious person from utilizing the transaction card 106 to conduct a second transaction via the transaction platform 108. FIG. 1F illustrates the fraud detection platform 102 interacting with a client device 110 of the user to obtain user input regarding the attempted second transaction. FIG. 1G illustrates the fraud detection platform 102 performing one or more additional actions based on the attempted second transaction.

In FIGS. 1A-1G, assume that a financial institution created a transaction account and issued the transaction card 106, in association with the transaction account, based on an application from the user (e.g., a credit card application, a checking account application, and/or the like). Assume further that the user, upon receipt of the transaction card 106 from the financial institution, activated the transaction card 106 to render the transaction card 106 capable of being used to conduct transactions.

To issue the transaction card 106, the financial institution may have produced, or obtained from a third party, a physical structure having one or more components embedded therein. The physical structure may include one or more layers of plastic (e.g., polyvinyl chloride (PVC), polyethylene terephthalate (PET), and/or the like), graphene, metal (e.g., stainless steel), and/or the like to define a substantially rectangular shape. The substantially rectangular shape may have a length of approximately 85.60 millimeters (mm) and a width of approximately 53.98 mm. The one or more components may include an accelerometer (e.g., to detect a measure of shaking of the transaction card 106) and one or more biometric sensors, such as a heart rate sensor, a moisture sensor, a sound sensor, and/or the like (e.g., to detect a heart rate of the user, a perspiration level of the user, a breathing rate of the user, a shaky voice level of the user, and/or the like). The one or more components may be utilized to assess a measure of nervousness of the user during a transaction. A high degree of nervousness during the transaction may be indicative of fraud. For example, the user may be nervous when making a transaction under duress and, as a result, may shake the transaction card 106, experience an elevated heart rate, have an increased perspiration level, breathe heavily, and/or speak with a shaky voice. The same may be true of a malicious person attempting to make a fraudulent transaction.

To associate the transaction card 106 with the transaction account, the financial institution may have generated transaction card information and printed the transaction card information on an exterior of the structure. The transaction card information may include a credit card number, a debit card number, an expiration date associated with the credit card number or the debit card number, a card verification value (CVV) associated with the credit card number or the debit card number, and/or the like. To enable the transaction platform 108 to process the transaction card information during a transaction, the transaction card 106 may further include a magnetic strip (e.g., to allow the transaction card 106 to be swiped through the transaction terminal) and/or an EMV chip (e.g., to allow the transaction card 106 to be inserted into the transaction terminal). Additionally, or alternatively, the transaction card 106 may include one or more near field communication (NFC) components, such as an EMV chip, an NFC antenna, a battery, and/or the like (e.g., to allow the transaction card 106 to communicate with the transaction terminal without having to come in contact with the transaction terminal).

In FIG. 1A, assume that the transaction card 106, upon issuance by the financial institution, has been configured to communicate with the fraud detection platform 102 during transactions. For example, the transaction card 106 may be configured to provide data, associated with the transactions, to the fraud detection platform 102 (e.g., from transaction platforms, from the accelerometer, from the one or more biometric sensors, and/or the like). As another example, the transaction card 106 may be configured to provide the data to an intermediate device (e.g., a back-end server of the financial institution), which transmits the data to the fraud detection platform 102. In either example, the fraud detection platform 102 may in turn, be configured to process and store the data from the transaction card 106 and communicate (either directly or via the intermediate device) with the transaction card 106 regarding the data.

As shown in FIG. 1A (and described in further detail below in connection with FIG. 2), the fraud detection platform 102 may obtain the fraud detection model 104 for use in processing the data from the transaction card 106. The fraud detection platform 102 may obtain the fraud detection model 104 by generating the fraud detection model 104. For example, as shown by reference number 112 in FIG. 1A, the fraud detection platform 102 may train the fraud detection model 104 with historical transaction data, historical biometric data, historical card movement data, historical fraud detection data, and historical user input data. The historical transaction data (also referred to herein as transaction parameters) may relate to one or more transactions conducted by the user with the transaction card 106 (e.g., a type of a transaction, an amount of the transaction, a location of the transaction, a time of the transaction, an object of the transaction, a quantity involved in the transaction, a merchant involved in the transaction, an ATM involved in the transaction, and/or the like). The historical biometric data (also referred to herein as biometric parameters) may relate to one or more biometric characteristics of the user that relate to a measure of nervousness of the user (e.g., a heart rate of the user, a perspiration level of the user, a rate of breathing of the user, a shaky voice level of the user, and/or the like). The historical card movement data (also referred to herein as card movement parameters) may relate to a measure of shaking of the transaction card 106 by the user that relates to the measure of nervousness of the user (e.g., a frequency of shaking of the transaction card 106, an amplitude of shaking of the transaction card 106, a pattern of shaking of the transaction card 106, an acceleration rate of the transaction card 106, and/or the like). The historical fraud detection data may relate to fraud detection during use of the transaction card (e.g., whether fraud was detected or not detected in association with a transaction, and/or the like). The historical user input data may relate to user input regarding the fraud detection (e.g., whether the fraud detection platform 102 accurately identified fraud, whether the fraud detection platform 102 failed to identify fraud, and/or the like).

The fraud detection platform 102 may train the fraud detection model 104 to generate a fraud score (e.g., a probability that a transaction is fraudulent, a probability that the transaction is not fraudulent, and/or the like) based on transaction data, biometric data, and card movement data relating to a transaction performed by the user using the transaction card 106. The fraud detection model 104 may be specific to the user and the transaction card 106. In other words, the fraud detection platform 102 may train a different fraud detection model for a different user or for a different transaction card of the same user. In some implementations, the fraud detection platform 102 may train the fraud detection model 104 to be used for a plurality of transaction cards of the same user. In other words, the fraud detection model 104 would not be specific to the transaction card 106. In this case, the fraud detection platform 102 may leverage the biometric parameters and the card movement parameters for a plurality of transaction cards to train the fraud detection platform 102. This permits the fraud detection platform 102 to conserve computing resources that would have otherwise been used to train separate fraud detection models for the plurality of transaction cards of the user.

In some implementations, another device, such as a server device, may train the fraud detection model 104. The fraud detection platform 102 may later obtain the fraud detection model 104 from the other device. The other device may update and send (e.g., on a scheduled basis, on an on-demand basis, on a triggered basis, on a periodic basis, and/or the like) the fraud detection model 104 to the fraud detection platform 102.

In some implementations, after training or obtaining the fraud detection model 104, the fraud detection platform 102 may store the fraud detection model 104 in a repository of machine learning models (e.g., associated with different transaction cards, and/or the like). The fraud detection platform 102 may later obtain the fraud detection model 104 by selecting the fraud detection model 104 from the repository of machine learning models. As will be described below, the fraud detection platform 102 may use the fraud detection model 104 to identify which items of the transaction parameters, the biometric parameters, and/or the card movement parameters are indicative of fraudulent activity.

In the description to follow, the fraud detection platform 102 will be described as performing actions based on the transaction card 106 being used to make purchases of one or more items. It should be understood that the fraud detection platform 102 may perform the actions based on different uses of the transaction card 106 (e.g., withdrawing money from an ATM, and/or the like) that may not involve making purchases of items.

In FIG. 1B, assume that the user presented the transaction card 106 to a transaction terminal associated with the transaction platform 108 to conduct a first transaction (e.g., to purchase a sweater from a first company). For example, the user may have swiped the transaction card 106 in the transaction terminal, inserted the transaction card 106 in the transaction terminal, placed the transaction card 106 in close proximity to the transaction terminal, and/or the like.

As shown by reference number 114 in FIG. 1B and based on presenting the transaction card 106 to the transaction terminal, the transaction platform 108 may provide a first transaction request including first transaction data associated with the first transaction. The first transaction data may identify a type of the first transaction (e.g., a purchase), an amount of the first transaction (e.g., $100), a location of the first transaction (e.g., 123 Main Street, Philadelphia, PA 19148), a time of the first transaction (e.g., 12:36 PM E.S.T. on Apr. 1, 2020), an object of the first transaction (e.g., a sweater), a quantity involved in the first transaction (e.g., one), a merchant involved in the first transaction (e.g., the first company), and/or the like. The transaction platform 108 may transmit the first transaction request to the transaction card 106 to allow the first transaction data to be analyzed for anomalies relative to past behavior (e.g., the first transaction involving an unusual amount, an unusual location, an unusual time, an unusual object, an unusual quantity, an unusual merchant, and/or the like).

Based on the first transaction request, and as shown by reference number 116, the transaction card 106 may obtain first biometric data associated with the user of the transaction card 106 and/or first card movement data associated with the transaction card 106. The transaction card 106 may obtain the first biometric data using the one or more biometric sensors (e.g., the heart rate sensor, the moisture sensor, the sound sensor, and/or the like). The first biometric data, which may be detected during the first transaction (e.g., within a time frame prior to and after the transaction card 106 is presented to the transaction terminal), may identify a first heart rate of the user, a first perspiration level of the user, a first rate of breathing of the user, a first shaky voice level of the user, and/or the like. Additionally, or alternatively, the transaction card 106 may obtain the first card movement data using the accelerometer. The first card movement data, which may be detected during the first transaction, may identify a first measure of shaking of the transaction card 106 by the user. In this example, because the user has used the transaction card 106 voluntarily and honestly, the first biometric data and the first card movement data may indicate that the user is not experiencing a heightened measure of nervousness (e.g., a measure of nervousness that is not greater than a threshold measure of nervousness associated with the user).

As shown by reference number 118, the transaction card 106 may provide the first transaction data, the first biometric data, and/or the first card movement data (also referred to herein, individually, in combination, or collectively, as the first data) to the fraud detection platform 102. The transaction card 106 may transmit the first data to the fraud detection platform 102 based on receiving the first transaction request and obtaining the first biometric data and/or the first card movement data.

As shown by reference number 120 in FIG. 1C and based on receiving the first data, the fraud detection platform 102 may process the first data to determine a first fraud score. To process the first data, the fraud detection platform 102 may input the first data into the fraud detection model 104, and the fraud detection model 104 may in turn, output the first fraud score, which may represent a probability that the first transaction is fraudulent. The fraud detection model 104, when calculating the first fraud score, may refrain from increasing the first fraud score based on the first transaction data not being indicative of fraudulent activity. For example, the fraud detection model 104 may recognize that the user has previously purchased apparel from the first company, conducted transactions in Philadelphia, and/or the like, and thus conclude that the first transaction data is not anomalous.

Additionally, or alternatively, the fraud detection model 104, when calculating the first fraud score, may compare the first data with one or more thresholds associated with a measure of nervousness. For example, the fraud detection model 104 may refrain from increasing the first fraud score based on the first biometric data indicating that one or more biometric characteristics (e.g., the first heart rate, the first perspiration level, the first rate of breathing, and/or the first shaky voice level) fail to satisfy one or more biometric thresholds (e.g., fall within a range defined by a lower heart rate threshold and an upper heart rate threshold, a range defined by a lower perspiration threshold and an upper perspiration threshold, a range defined by a lower breathing rate threshold and an upper breathing rate threshold, a range defined by a lower shaky voice threshold and an upper shaky voice threshold, and/or the like) during the first transaction. As another example, the fraud detection model 104 may refrain from increasing the first fraud score based on the first card movement data indicating that a hand of the user fails to satisfy a shaking threshold (e.g., fall within a range defined by a lower shaking threshold and an upper shaking threshold, and/or the like) during the first transaction.

In some implementations, the fraud detection model 104 may calculate a first measure of nervousness based on the first biometric data and the first card movement data. In such a case, the fraud detection model 104, to calculate the first fraud score, may compare the first measure of nervousness with a nervousness threshold. The fraud detection model 104 may refrain from increasing the first fraud score based on the first measure of nervousness failing to satisfy the nervousness threshold. In this case, the fraud detection model 104 may determine that the first transaction has a low probability of being fraudulent.

As shown by reference number 122, the fraud detection platform 102 may determine that the first fraud score fails to satisfy a threshold score. For example, in order to determine whether to authorize or decline the first transaction, the fraud detection platform 102 may compare the first fraud score (e.g., 5%) with the threshold score (e.g., 90%). The fraud detection platform 102 may determine that the first fraud score is less than the threshold score. As a result, the fraud detection platform 102 may authorize the first transaction and allow the first transaction to proceed.

In some implementations, the threshold score may be one of a plurality of threshold scores, which may correspond to different actions to be performed by the fraud detection platform 102. For example, the plurality of threshold scores may include a first threshold score (e.g., 90%), a second threshold score (e.g., 94%), a third threshold score (e.g., 98%), and/or the like. To determine a course of action, the fraud detection platform 102 may compare the first fraud score respectively with the first threshold score, the second threshold score, the third threshold score, and/or the like. If the fraud detection platform 102 were to determine that the first fraud score satisfies the first threshold score (e.g., 90%), the fraud detection platform 102, may for example, seek to authenticate the first transaction via written authentication (e.g., by transmitting a notification to the user via a short message service (SMS) message, via an email, and/or the like). If the fraud detection platform 102 were to determine that the first fraud score satisfies the second threshold score (e.g., 94%), the fraud detection platform 102, may as another example, seek to authenticate the first transaction via verbal authentication (e.g., by placing a call to the user to obtain verbal confirmation, by placing a call to the user to perform voice analysis, and/or the like). If the fraud detection platform 102 were to determine that the first fraud score satisfies the third threshold score (e.g., 98%), the fraud detection platform 102, may as a further example, deny the transaction without seeking authentication. Other examples of threshold-based actions are possible.

As shown by reference number 124, and based on determining that the first fraud score fails to satisfy the threshold score (or the first threshold score), the fraud detection platform may provide a notification authorizing the first transaction to the transaction card 106. Based on receiving the notification, and as shown by reference number 126, the transaction card 106 may perform the first transaction via the transaction platform 108. For example, the transaction platform 108 may transmit the transaction card information through a card network to the financial institution associated with the transaction card 106 for approval. Once approved, the financial institution may transfer the $100 from the transaction account of the user to a transaction account of the first company, and the transaction terminal associated with the transaction platform 108 may issue a receipt for the user.

In FIG. 1D, assume that a malicious person obtained the transaction card 106 of the user. The malicious person, using the transaction card 106 dishonestly, presented the transaction card 106 to a transaction terminal associated with the transaction platform 108 to conduct a second transaction (e.g., to purchase six tablet computers from a second company). Similar to that described above, the malicious person may have swiped the transaction card 106 in the transaction terminal, inserted the transaction card 106 in the transaction terminal, placed the transaction card 106 in close proximity to the transaction terminal, and/or the like.

As shown by reference number 128 in FIG. 1D and based on presenting the transaction card 106 to the transaction terminal, the transaction platform 108 may provide a second transaction request including second transaction data associated with the second transaction. The second transaction data may identify a type of the second transaction (e.g., a purchase), an amount of the second transaction (e.g., $1800), a location of the second transaction (e.g., 2450 King Avenue, Billings, Montana 59102), a time of the second transaction (e.g., 4:55 PM E.S.T. on Apr. 15, 2020), an object of the second transaction (e.g., a tablet computer), a quantity involved in the second transaction (e.g., six), a merchant involved in the second transaction (e.g., the second company), and/or the like. The transaction platform 108 may transmit the second transaction request to the transaction card 106 to allow the second transaction data to be analyzed for anomalies relative to past behavior of the user (e.g., the second transaction involving an unusual amount, an unusual location, an unusual time, an unusual object, an unusual quantity, an unusual merchant, and/or the like).

Based on the second transaction request, and as shown by reference number 130, the transaction card 106 may obtain second biometric data associated with the malicious person and/or second card movement data associated with the transaction card 106. The transaction card 106 may obtain the second biometric data using the one or more biometric sensors (e.g., the heart rate sensor, the moisture sensor, the sound sensor, and/or the like). The second biometric data, which may be detected during the second transaction (e.g., within a time frame prior to and after the transaction card 106 being presented to the transaction terminal), may identify a second heart rate of the malicious person, a second perspiration level of the malicious person, a second rate of breathing of the malicious person, a second shaky voice level of the malicious person, and/or the like. Additionally, or alternatively, the transaction card 106 may obtain the second card movement data using the accelerometer. The second card movement data, which may be detected during the second transaction, may identify a second measure of shaking of the transaction card 106 by the malicious person. In this example, because the malicious person has used the transaction card 106 dishonestly, the second biometric data and the second card movement data may indicate that the malicious person is experiencing increased nervousness. Additionally, or alternatively, because the malicious person may have different biometric characteristics than the user and may handle the transaction card 106 differently, the second biometric data and the second card movement data may indicate that the transaction card 106 is being used by a person other than the user.

As shown by reference number 132, the transaction card 106 may provide the second transaction data, the second biometric data, and/or the second card movement data (also referred to herein, individually, in combination, or collectively, as the second data) to the fraud detection platform 102. The transaction card 106 may transmit the second data to the fraud detection platform 102 based on receiving the second transaction request and obtaining the second biometric data and/or the second card movement data.

As shown by reference number 134 in FIG. 1E and based on receiving the second data, the fraud detection platform 102 may process the second data to determine a second fraud score. To process the second data, the fraud detection platform 102 may input the second data into the fraud detection model 104, and the fraud detection model 104 may in turn, output the second fraud score, which may represent a probability that the second transaction is fraudulent. The fraud detection model 104, when calculating the second fraud score, may increase the second fraud score based on the second transaction data being indicative of fraudulent activity. For example, the fraud detection model 104 may recognize that the user has not previously purchased a plurality of a single items from the second company, conducted transactions in Montana, and/or the like, and thus conclude that the second transaction data is anomalous.

Additionally, or alternatively, the fraud detection model 104, when calculating the second fraud score, may compare the second data with one or more thresholds associated with a measure of nervousness. For example, the fraud detection model 104 may increase the second fraud score based on the second biometric data indicating that one or more biometric characteristics (e.g., the second heart rate, the second perspiration level, the second rate of breathing, and/or the second shaky voice level) satisfy the one or more biometric thresholds (e.g., fall within the range defined by the lower heart rate threshold and the upper heart rate threshold, the range defined by the lower perspiration threshold and the upper perspiration threshold, the range defined by the lower breathing rate threshold and the upper breathing rate threshold, the range defined by the lower shaky voice threshold and the upper shaky voice level threshold, and/or the like) during the second transaction. As another example, the fraud detection model 104 may increase the second fraud score based on the second card movement data indicating that a hand of the malicious person satisfies the shaking threshold (e.g., falls within the range defined by the lower shaking threshold and the upper shaking threshold, and/or the like) during the second transaction.

In some implementations, the fraud detection model 104 may calculate a second measure of nervousness based on the second biometric data and the second card movement data. In such a case, the fraud detection model 104, to calculate the second fraud score, may compare the second measure of nervousness with the nervousness threshold. The fraud detection model 104 may increase the second fraud score based on the second measure of nervousness satisfying the nervousness threshold. In this case, the fraud detection model 104 may determine that the second transaction has a high probability of being fraudulent.

As shown by reference number 136, the fraud detection platform 102 may determine that the second fraud score satisfies the threshold score. For example, in order to determine whether to authorize or decline the second transaction, the fraud detection platform 102 may compare the second fraud score (e.g., 95%) with the threshold score (e.g., 90%). In such an example, the fraud detection platform 102 may determine that the second fraud score is greater than the threshold score. As another example, as indicated above in connection with FIG. 1C, the fraud detection platform 102 may compare the second fraud score (e.g., 95%) with the plurality of threshold scores (e.g., 90%, 94%, 98%, and/or the like) to determine a course of action. In such an example, the fraud detection platform 102 may determine that the second fraud score is greater than the second threshold score (e.g., 94%). As a result, the fraud detection platform 102 may seek to authenticate the second transaction via verbal authentication (e.g., by placing a call to the user to obtain verbal confirmation, by placing a call to the user to perform voice analysis, and/or the like). In either example, the fraud detection platform 102 may decline the second transaction and prevent the second transaction from proceeding.

As shown by reference number 138, and based on determining that the second fraud score satisfies the threshold score (or the second threshold score), the fraud detection platform 102 may provide a notification declining the second transaction to the transaction card 106. Based on receiving the notification, and as shown by reference number 140, the transaction card 106 may deny the second transaction, via the transaction platform 108. Thus, the financial institution associated with the transaction card 106 may decline to transfer the $1800 from the transaction account of the user to a transaction account of the second company. As a result, the malicious person may be prevented from completing the second transaction and obtaining the six tablet computers.

In some implementations, the fraud detection platform 102 may perform one or more additional actions based on the second fraud score (but also applies to the first transaction and the first fraud score). For example, as shown by reference number 142 in FIG. 1F, the fraud detection platform 102 may provide, to the client device 110 of the user, a notification requesting user input that indicates whether the second transaction is approved or unapproved by the user. In response, and as shown by reference number 144, the user may provide, via the client device 110 and based on the notification, the user input that indicates that the second transaction is unapproved by the user. To verify that the user input is obtained from the user, and not a malicious person, the user input may include one or more unique identifiers associated with the user (e.g., a name of the user, a date of birth of the user, a social security number of the user, a zip code of the user, a voice of the user, a fingerprint of the user, and/or the like).

As shown by reference number 146, the fraud detection platform 102, based on receiving the user input, may retrain the fraud detection model 104 with the user input to generate an updated fraud detection model 148. As described above with respect to an initial training of the fraud detection model 104, the fraud detection platform 102 may generate the updated fraud detection model 148 by retraining the fraud detection model 104 with the historical transaction data (e.g., updated to include the second transaction data, and/or the like), the historical biometric data (e.g., updated to include the second biometric data, and/or the like), historical card movement data (e.g., updated to include the second card movement data, and/or the like), the historical fraud detection data (e.g., updated to include the second fraud score, and/or the like), and the historical user input data (e.g., updated to include the user input regarding the second transaction, and/or the like). In some implementations, the other device (e.g., the server device described above with respect to the fraud detection model 104) may retrain the fraud detection model 104. In such a case, the fraud detection platform 102 may transmit the second transaction data, the second biometric data, the second card movement data, the second fraud score, and/or the user input to the other device to allow the other device to generate the updated fraud detection model 148.

While in this example, the fraud detection platform 102 or the other device retrained the fraud detection model 104 based on the user input indicating that the second transaction is unapproved by the user, it should be understood that the fraud detection platform 102 or the other device may retrain the fraud detection model 104 based on receiving other user input, with or without a prior notification to the user. For example, the user may provide, to the fraud detection platform 102, user input that indicates, independent of a notification from the fraud detection platform 102, that a transaction was unapproved by the user. As another example, the user may provide, to the fraud detection platform 102, and in response to a notification of potential fraud (e.g., as shown by reference number 142), that a transaction was approved by the user. In either example, the fraud detection platform 102 or the other device may incorporate the user input into the historical user input data to retrain the fraud detection model 104. Thus, over time, the fraud detection platform 102 or the other device may fine tune the fraud detection model 104 to be more tailored to recognize behavior of the user.

As shown by reference number 150 in FIG. 1G, and based on determining that the second fraud score satisfies the threshold score (or one or more of the plurality of threshold scores), the fraud detection platform 102 may perform one or more additional actions to facilitate investigation of the second transaction and/or the malicious person. For example, the fraud detection platform 102 may provide the second fraud score to the financial institution associated with the transaction card 106. In such an example, the fraud detection platform 102 may transmit a notification to the financial institution. The notification may include the second fraud score, the second transaction data, the second biometric data, the second card movement data, the user input regarding the second transaction, and/or the like. As another example, the fraud detection platform 102 may cause law enforcement to be dispatched to the location of the second transaction. In such an example, the fraud detection platform 102 may transmit, to a platform associated with the law enforcement, a notification of fraud. The notification may include a description of the second transaction, such as the type of the second transaction, the amount of the second transaction, the location of the second transaction, the time of the second transaction, the object involved in the second transaction, the merchant involved in the second transaction, and/or the like. In either example, the fraud detection platform 102 may conserve resources (e.g., networking resources, computing resources, and/or the like) that might otherwise have been consumed assessing fraudulent transactions attempted by the malicious person in the future.

The fraud detection platform 102 has been described as receiving and processing transaction data (e.g., the first transaction data, the second transaction data), biometric data (e.g., the first biometric data, the second biometric data), and/or card movement data (e.g., the first card movement data, the second card movement data) to identify whether transactions (e.g., the first transaction, the second transaction) were fraudulent. However, it should be understood that the fraud detection platform 102, in some implementations, may receive and process one of the transaction data, the biometric data, and the card movement data, a subset of the transaction data, the biometric data, and the card movement data, additional types of data, and/or the like.

By utilizing one or more of the transaction data, the biometric data, and/or the card movement data to assess whether a transaction is fraudulent, the fraud detection platform 102 may conserve computing and/or network resources that might have otherwise been consumed by the financial institution providing inaccurate reports of fraud to one or more devices, providing inaccurate alerts of incidents of fraud to one or more devices, providing reimbursements and/or notifications of reimbursements to one or more devices, cancelling transaction cards, issuing and providing new transaction cards, and/or the like. Additionally, or alternatively, the fraud detection platform 102 may conserve computing and/or network resources that might have otherwise been consumed by the user correcting inaccurate reports of fraud, repeating a transaction that was improperly indicated as fraud, notifying the financial institution that the transaction was fraudulent, and/or the like.

As indicated above, FIGS. 1A-1G are provided as one or more examples. Other examples may differ from what is described with regard to FIGS. 1A-1G. The number and arrangement of devices shown in FIGS. 1A-1G are provided as an example. In practice, there may be additional devices, fewer devices, different devices, or differently arranged devices than those shown in FIGS. 1A-1G. Furthermore, two or more devices shown in FIGS. 1A-1G may be implemented within a single device, or a single device shown in FIGS. 1A-1G may be implemented as multiple, distributed devices. Additionally, or alternatively, a set of devices (e.g., one or more devices) shown in FIGS. 1A-1G may perform one or more functions described as being performed by another set of devices shown in FIGS. 1A-1G.

Figure 2:
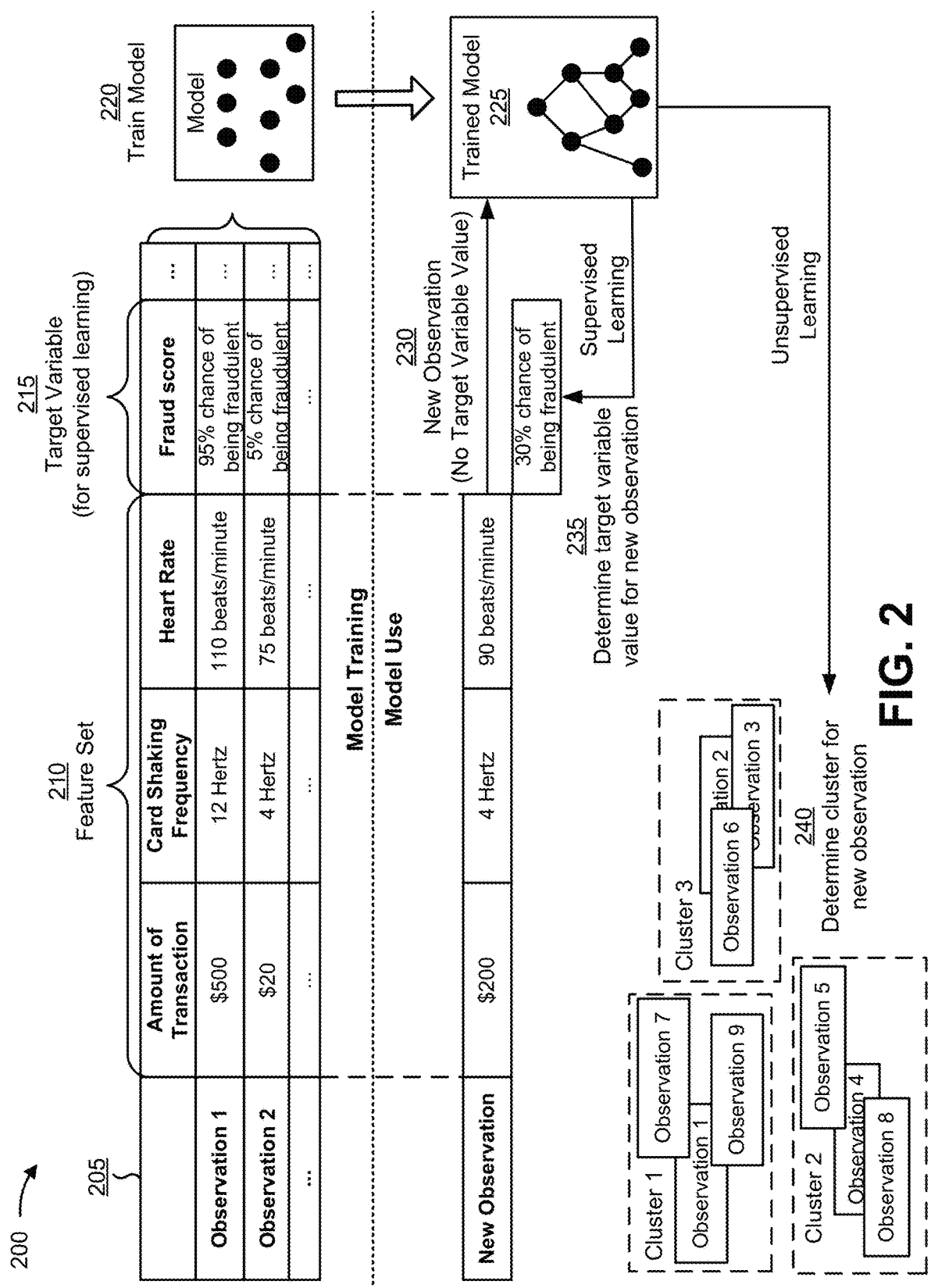
FIG. 2 is a diagram illustrating an example of training and using a model to identify fraudulent transactions.

FIG. 2 is a diagram illustrating an example 200 of training and using a model (e.g., the fraud detection model 104, the updated fraud detection model 148, and/or the like) to detect fraudulent transactions. The model training and usage described herein may be performed using a machine learning system. The machine learning system may include or may be included in a computing device, a server, a cloud computing environment, and/or the like, such as the fraud detection platform 102, which are described in more detail elsewhere herein.

As shown by reference number 205, a model may be trained using a set of observations. The set of observations may be obtained from historical data, such as data gathered during one or more processes described herein. The historical data may include historical transaction data relating to transactions conducted by users (e.g., a type of a transaction, an amount of the transaction, a location of the transaction, a time of the transaction, an object of the transaction, a quantity involved in the transaction, a merchant involved in the transaction, an ATM involved in the transaction, and/or the like), historical biometric data relating to one or more biometric characteristics of users (e.g., a heart rate of a user, a perspiration level of the user, a rate of breathing of the user, a shaky voice level of the user, and/or the like), historical card movement data relating to a measure of shaking of transaction cards by users (e.g., a frequency of shaking of a transaction card, an acceleration rate of the transaction card, and/or the like), historical fraud detection data relating to fraud detection (e.g., whether fraud was detected or not detected, and/or the like), and historical user input data relating to user input (e.g., whether fraud was properly detected, whether fraud should have been detected, and/or the like), and/or the like. In some implementations, the machine learning system may receive the set of observations (e.g., as input) from transaction cards (e.g., the transaction card 106), as described elsewhere herein.

As shown by reference number 210, the set of observations includes a feature set. The feature set may include a set of variables, and a variable may be referred to as a feature. A specific observation may include a set of variable values (or feature values) corresponding to the set of variables. In some implementations, the machine learning system may determine variables for a set of observations and/or variable values for a specific observation based on input received from transaction cards. For example, the machine learning system may identify a feature set (e.g., one or more features and/or feature values) by extracting the feature set from structured data, by performing natural language processing to extract the feature set from unstructured data, by receiving input from an operator, and/or the like.

As an example, a feature set for a set of observations may include a first feature of "Amount of Transaction," a second feature of "Card Shaking Frequency," a third feature of "Heart Rate," and so on. As shown, for a first observation, the first feature may be "$500," the second feature may be "12 Hertz," the third feature may be "110 beats/minute," and so on. These features and feature values are provided as examples and may differ in other examples. For example, the feature set may include one or more of the following transaction features: a location of the transaction, a time of the transaction, an object of the transaction, a merchant involved in the transaction, a type of the transaction, an ATM involved in the transaction, and/or the like. As another example, the feature set may include one or more of the following biometric features: a perspiration rate of a user, a rate of breathing of the user, a shaky voice level of the user, and/or the like.

As shown by reference number 215, the set of observations may be associated with a target variable. The target variable may represent a variable having a numeric value, may represent a variable having a numeric value that falls within a range of values or has some discrete possible values, may represent a variable that is selectable from one of multiple options (e.g., one of multiples classes, classifications, labels, and/or the like), may represent a variable having a Boolean value, and/or the like. A target variable may be associated with a target variable value, and a target variable value may be specific to an observation. In example 200, the target variable is "Fraud Score," which may be "95% chance of being fraudulent" for the first observation.

The feature set and target variable described above are provided as examples, and other examples may differ from what is described above. For example, for a target variable of "5% chance of being fraudulent," the feature set may include "$20," "4 Hertz," and "75 beats/minute," and/or the like.

The target variable may represent a value that a model is being trained to predict, and the feature set may represent the variables that are input to a trained model to predict a value for the target variable. The set of observations may include target variable values so that the model can be trained to recognize patterns in the feature set that lead to a target variable value. A model that is trained to predict a target variable value may be referred to as a supervised learning model.

In some implementations, the model may be trained on a set of observations that do not include a target variable. This may be referred to as an unsupervised learning model. In this case, the model may learn patterns from the set of observations without labeling or supervision, and may provide output that indicates such patterns, such as by using clustering and/or association to identify related groups of items within the set of observations.

As shown by reference number 220, the machine learning system may train a model using the set of observations and using one or more machine learning algorithms, such as a regression algorithm, a decision tree algorithm, a neural network algorithm, a k-nearest neighbor algorithm, a support vector machine algorithm, and/or the like. After training, the machine learning system may store the model as a trained model 225 to be used to analyze new observations.

As shown by reference number 230, the machine learning system may apply the trained model 225 to a new observation, such as by receiving a new observation and inputting the new observation to the trained model 225. As shown, the new observation may include a first feature of "200," a second feature of "4 Hertz," a third feature of "90 beats/minute," and so on, as an example. The machine learning system may apply the trained model 225 to the new observation to generate an output (e.g., a result). The type of output may depend on the type of machine learning model and/or the type of machine learning task being performed. For example, the output may include a predicted value of a target variable, such as when supervised learning is employed. Additionally, or alternatively, the output may include information that identifies a cluster to which the new observation belongs, information that indicates a degree of similarity between the new observation and one or more other observations, and/or the like, such as when unsupervised learning is employed.

As an example, the trained model 225 may predict "30% chance of being fraudulent" for the target variable of "Fraud Score" for the new observation, as shown by reference number 235. Based on this prediction, the machine learning system may provide a first recommendation, may provide output for determination of a first recommendation, may perform a first automated action, may cause a first automated action to be performed (e.g., by instructing another device to perform the automated action), and/or the like. The first recommendation may include, for example, to provide, to a transaction card, a notification authorizing the transaction. The first automated action may include, for example, to authorize the transaction, and/or the like.

As another example, if the machine learning system were to predict "90% chance of being fraudulent" for the target variable of "Fraud Score," then the machine learning system may provide a second (e.g., different) recommendation (e.g., to provide a notification, to a transaction card, declining the transaction, to provide a notification to law enforcement, to provide a notification to a client device to obtain user input, to provide a notification to a financial institution associated with the transaction card, and/or the like) and/or may perform or cause performance of a second (e.g., different) automated action (e.g., decline the transaction, notify law enforcement, notify the client device to obtain the user input, notify the financial institution associated with the transaction card, and/or the like).

In some implementations, the trained model 225 may classify (e.g., cluster) the new observation in a cluster, as shown by reference number 240. The observations within a cluster may have a threshold degree of similarity. As an example, if the machine learning system classifies the new observation in a first cluster (e.g., of likely non-fraudulent transactions), then the machine learning system may provide a first recommendation, such as the first recommendation described above. Additionally, or alternatively, the machine learning system may perform a first automated action and/or may cause a first automated action to be performed (e.g., by instructing another device to perform the automated action) based on classifying the new observation in the first cluster, such as the first automated action described above.

As another example, if the machine learning system were to classify the new observation in a second cluster (e.g., of likely fraudulent transactions), then the machine learning system may provide a second (e.g., different) recommendation, such as the second recommendation described above, and/or may perform or cause performance of a second (e.g., different) automated action, such as the second automated action described above.

In some implementations, the recommendation and/or the automated action associated with the new observation may be based on a target variable value having a particular label (e.g., classification, categorization, and/or the like), may be based on whether a target variable value satisfies one or more threshold (e.g., whether the target variable value is greater than a threshold, is less than a threshold, is equal to a threshold, falls within a range of threshold values, and/or the like), may be based on a cluster in which the new observation is classified, and/or the like.

In this way, the machine learning system may apply a rigorous and automated process to detect fraudulent transactions. The machine learning system enables recognition and/or identification of tens, hundreds, thousands, or millions of features and/or feature values for tens, hundreds, thousands, or millions of observations, thereby increasing accuracy and consistency and reducing delay associated with detecting fraudulent transactions relative to requiring computing resources to be allocated for tens, hundreds, or thousands of operators to manually detect fraudulent transactions using the features or feature values.

As indicated above, FIG. 2 is provided as an example. Other examples may differ from what is described in connection with FIG. 2. The feature set and target variables are provided as an example. In practice, there may be additional features, fewer features, or different features than those shown in FIG. 2.

Figure 3:
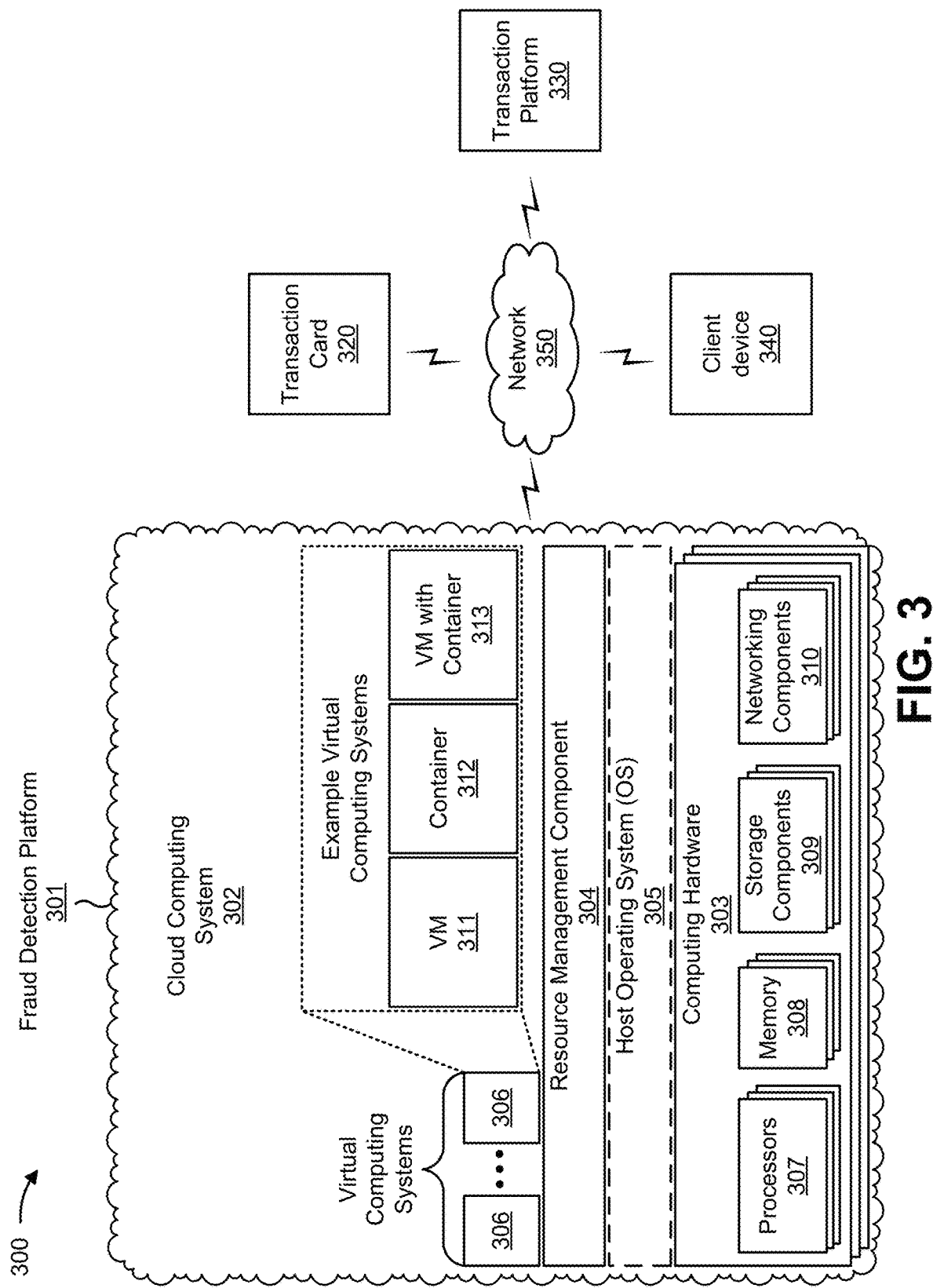
FIG. 3 is a diagram of an example environment in which systems and/or methods described herein may be implemented.

FIG. 3 is a diagram of an example environment 300 in which systems and/or methods described herein may be implemented. As shown in FIG. 3, environment 300 may include a fraud detection platform 301, which may include one or more elements of and/or may execute within a cloud computing system 302. The cloud computing system 302 may include one or more elements 303-313, as described in more detail below. As further shown in FIG. 3, environment 300 may include a transaction card 320, a transaction platform 330, a client device 340, and/or a network 350. Devices and/or elements of environment 300 may interconnect via wired connections and/or wireless connections.

The cloud computing system 302 includes computing hardware 303, a resource management component 304, a host operating system (OS) 305, and/or one or more virtual computing systems 306. The resource management component 304 may perform virtualization (e.g., abstraction) of computing hardware 303 to create the one or more virtual computing systems 306. Using virtualization, the resource management component 304 enables a single computing device (e.g., a computer, a server, and/or the like) to operate like multiple computing devices, such as by creating multiple isolated virtual computing systems 306 from computing hardware 303 of the single computing device. In this way, computing hardware 303 can operate more efficiently, with lower power consumption, higher reliability, higher availability, higher utilization, greater flexibility, and lower cost than using separate computing devices.

Computing hardware 303 includes hardware and corresponding resources from one or more computing devices. For example, computing hardware 303 may include hardware from a single computing device (e.g., a single server) or from multiple computing devices (e.g., multiple servers), such as multiple computing devices in one or more data centers. As shown, computing hardware 303 may include one or more processors 307, one or more memories 308, one or more storage components 309, and/or one or more networking components 310. Examples of a processor, a memory, a storage component, and a networking component (e.g., a communication component) are described elsewhere herein.

The resource management component 304 includes a virtualization application (e.g., executing on hardware, such as computing hardware 303) capable of virtualizing computing hardware 303 to start, stop, and/or manage one or more virtual computing systems 306. For example, the resource management component 304 may include a hypervisor (e.g., a bare-metal or Type 1 hypervisor, a hosted or Type 2 hypervisor, and/or the like) or a virtual machine monitor, such as when the virtual computing systems 306 are virtual machines 311. Additionally, or alternatively, the resource management component 304 may include a container manager, such as when the virtual computing systems 306 are containers 312. In some implementations, the resource management component 304 executes within and/or in coordination with a host operating system 305.

A virtual computing system 306 includes a virtual environment that enables cloud-based execution of operations and/or processes described herein using computing hardware 303. As shown, a virtual computing system 306 may include a virtual machine 311, a container 312, a hybrid environment 313 that includes a virtual machine and a container, and/or the like. A virtual computing system 306 may execute one or more applications using a file system that includes binary files, software libraries, and/or other resources required to execute applications on a guest operating system (e.g., within the virtual computing system 306) or the host operating system 305.

Although the fraud detection platform 301 may include one or more elements 303-313 of the cloud computing system 302, may execute within the cloud computing system 302, and/or may be hosted within the cloud computing system 302, in some implementations, the fraud detection platform 301 may not be cloud-based (e.g., may be implemented outside of a cloud computing system) or may be partially cloud-based. For example, the fraud detection platform 301 may include one or more devices that are not part of the cloud computing system 302, such as device 400 of FIG. 4, which may include a standalone server or another type of computing device. The fraud detection platform 301, which may correspond to the fraud detection platform 102, may perform one or more operations and/or processes described in more detail elsewhere herein.

Transaction card 320 includes a transaction card capable receiving, generating, storing, processing, and/or providing information associated with a transaction. For example, transaction card 320 may include a credit card, a debit card, a gift card, a payment card, an ATM card, a store-valued card, a fleet card, a transit card, an access card, and/or the like. Transaction card 320 may include one or more devices (e.g., a heart rate sensor, a moisture sensor, an accelerometer, a microphone, and/or the like) to detect one or more items associated with a measure of nervousness of a user. The transaction card 320, which may correspond to the transaction card 106, may communicate with the fraud detection platform 301 and/or the transaction platform 330 to complete a transaction.

Transaction platform 330 includes one or more devices capable of receiving, generating, storing, processing, and/or providing information associated with executing a transaction. For example, transaction platform 330 may include a server device (e.g., a host server, a web server, an application server, and/or the like), a data center device, a cloud computing system, and/or the like. Transaction platform 330, which may correspond to the transaction platform 108, may calculate an amount owed by a user for a transaction and may communicate with the transaction card 320 to execute the transaction.

Client device 340 includes one or more devices capable of receiving, generating, storing, processing, and/or providing information associated with use of transaction card 320. For example, client device 340 may include a desktop computer, a mobile phone (e.g., a smart phone, a radiotelephone, and/or the like), a laptop computer, a tablet computer, a handheld computer, a gaming device, a virtual reality device, a wearable communication device (e.g., a smart wristwatch, a pair of smart eyeglasses, and/or the like), or a similar type of device. Client device 340, which may correspond to the client device 110, may communicate with fraud detection platform 102 to indicate that a transaction is approved or unapproved by a user.

Network 350 includes one or more wired and/or wireless networks. For example, network 350 may include a cellular network (e.g., a long-term evolution (LTE) network, a code division multiple access (CDMA) network, a third generation (3G) network, a fourth generation (4G) network, a fifth generation (5G) network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or a combination of these or other types of networks. The network 350 enables communication among the devices of environment 300.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4:
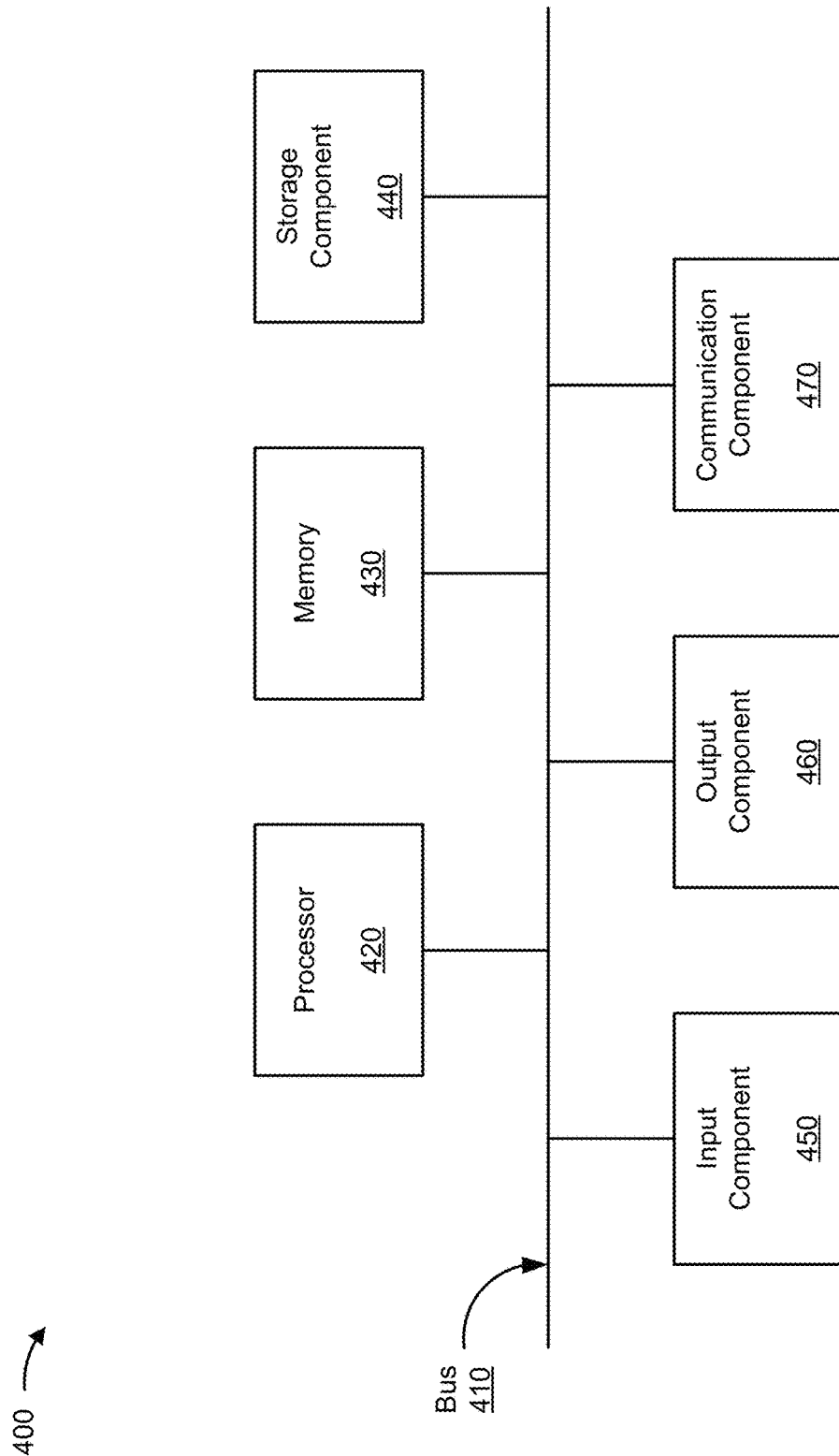
FIG. 4 is a diagram of example components of one or more devices of FIG. 3.

FIG. 4 is a diagram of example components of a device 400, which may correspond to fraud detection platform 301, transaction card 320, transaction platform 330, and/or client device 340. In some implementations, fraud detection platform 301, transaction card 320, transaction platform 330, and/or client device 340 may include one or more devices 400 and/or one or more components of device 400. As shown in FIG. 4, device 400 may include a bus 410, a processor 420, a memory 430, a storage component 440, an input component 450, an output component 460, and a communication component 470.

Bus 410 includes a component that enables wired and/or wireless communication among the components of device 400. Processor 420 includes a central processing unit, a graphics processing unit, a microprocessor, a controller, a microcontroller, a digital signal processor, a field-programmable gate array, an application-specific integrated circuit, and/or another type of processing component. Processor 420 is implemented in hardware, firmware, or a combination of hardware and software. In some implementations, processor 420 includes one or more processors capable of being programmed to perform a function. Memory 430 includes a random access memory, a read only memory, and/or another type of memory (e.g., a flash memory, a magnetic memory, and/or an optical memory).

Storage component 440 stores information and/or software related to the operation of device 400. For example, storage component 440 may include a hard disk drive, a magnetic disk drive, an optical disk drive, a solid state disk drive, a compact disc, a digital versatile disc, and/or another type of non-transitory computer-readable medium. Input component 450 enables device 400 to receive input, such as user input and/or sensed inputs. For example, input component 450 may include a touch screen, a keyboard, a keypad, a mouse, a button, a microphone, a switch, a sensor, a global positioning system component, an accelerometer, a gyroscope, an actuator, and/or the like. Output component 460 enables device 400 to provide output, such as via a display, a speaker, and/or one or more light-emitting diodes. Communication component 470 enables device 400 to communicate with other devices, such as via a wired connection and/or a wireless connection. For example, communication component 470 may include a receiver, a transmitter, a transceiver, a modem, a network interface card, an antenna, and/or the like.

Device 400 may perform one or more processes described herein. For example, a non-transitory computer-readable medium (e.g., memory 430 and/or storage component 440) may store a set of instructions (e.g., one or more instructions, code, software code, program code, and/or the like) for execution by processor 420. Processor 420 may execute the set of instructions to perform one or more processes described herein. In some implementations, execution of the set of instructions, by one or more processors 420, causes the one or more processors 420 and/or the device 400 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 4 are provided as an example. Device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
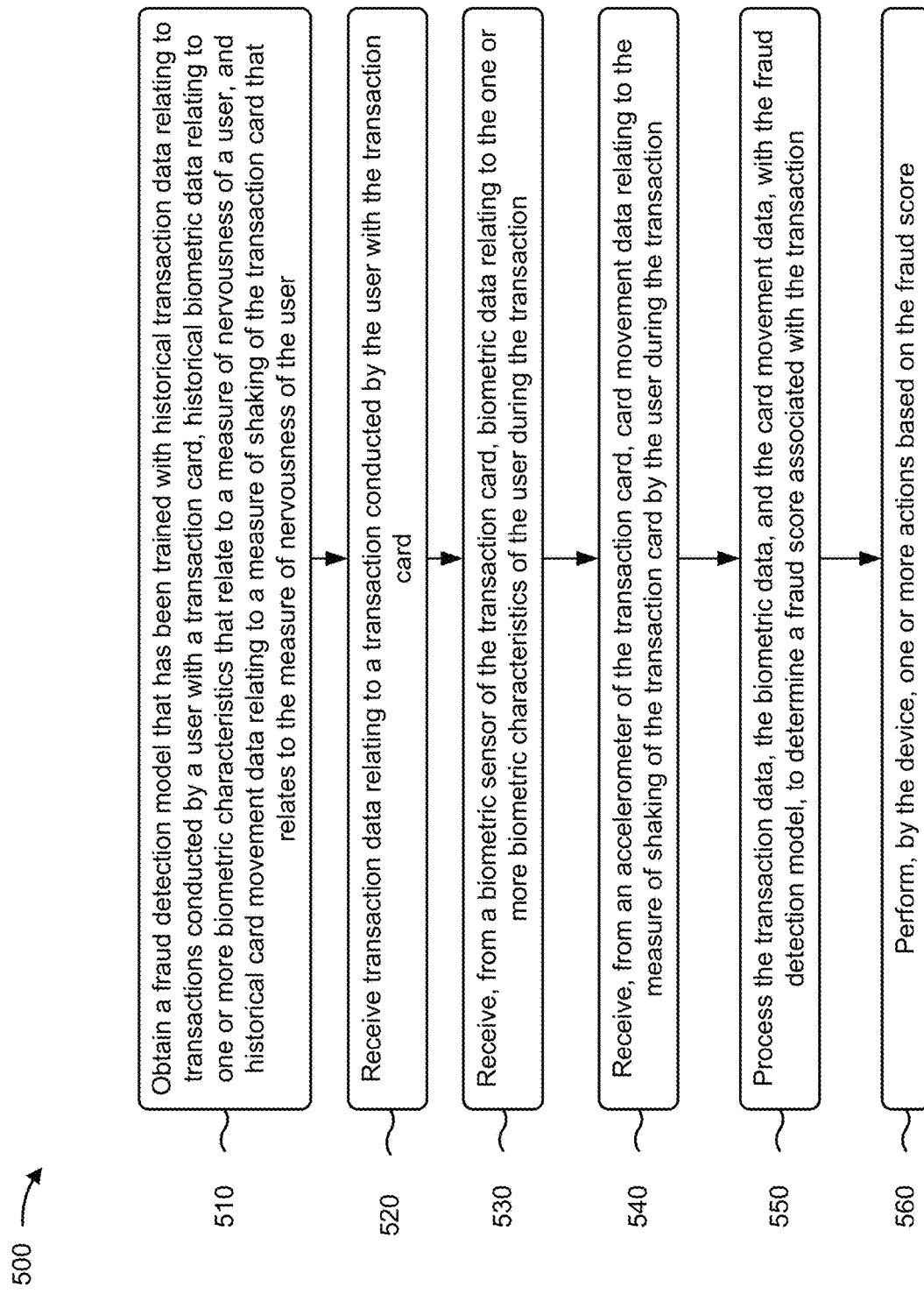
FIGS. 5-7 are flow charts of example processes relating to utilizing card movement data to identify fraudulent transactions.

FIG. 5 is a flow chart of an example process 500 associated with utilizing card movement data to identify fraudulent transactions. In some implementations, one or more process blocks of FIG. 5 may be performed by a device (e.g., the fraud detection platform 301, the fraud detection platform 102). In some implementations, one or more process blocks of FIG. 5 may be performed by another device or a group of devices separate from or including the device, such as a transaction card (e.g., the transaction card 320, the transaction card 106), a transaction platform (e.g., the transaction platform 330, the transaction platform 108), a client device (e.g., the client device 340, the client device 110), and/or the like. Additionally, or alternatively, one or more process blocks of FIG. 5 may be performed by one or more components of a device 400, such as processor 420, memory 430, storage component 440, input component 450, output component 460, communication component 470, and/or the like.

As shown in FIG. 5, process 500 may include obtaining a fraud detection model that has been trained with historical transaction data relating to transactions conducted by a user with a transaction card, historical biometric data relating to one or more biometric characteristics that relate to a measure of nervousness of a user, and historical card movement data relating to a measure of shaking of the transaction card that relates to the measure of nervousness of the user (block 510). For example, the device may obtain a fraud detection model that has been trained with historical transaction data relating to transactions conducted by a user with a transaction card, historical biometric data relating to one or more biometric characteristics that relate to a measure of nervousness of a user, and historical card movement data relating to a measure of shaking of the transaction card that relates to the measure of nervousness of the user, as described above. In some implementations, the fraud detection model may have been trained to identify which items of the historical transaction data, the historical biometric data, and the historical card movement data are indicative of fraudulent activity.

As further shown in FIG. 5, process 500 may include receiving transaction data relating to a transaction conducted by the user with the transaction card (block 520). For example, the device may receive transaction data relating to a transaction conducted by the user with the transaction card, as described above.

As further shown in FIG. 5, process 500 may include receiving, from a biometric sensor of the transaction card, biometric data relating to the one or more biometric characteristics of the user during the transaction (block 530). For example, the device may receive, from a biometric sensor of the transaction card, biometric data relating to the one or more biometric characteristics of the user during the transaction, as described above.

As further shown in FIG. 5, process 500 may include receiving, from an accelerometer of the transaction card, card movement data relating to the measure of shaking of the transaction card by the user during the transaction (block 540). For example, the device may receive, from an accelerometer of the transaction card, card movement data relating to the measure of shaking of the transaction card by the user during the transaction, as described above.

As further shown in FIG. 5, process 500 may include processing the transaction data, the biometric data, and the card movement data, with the fraud detection model, to determine a fraud score associated with the transaction (block 550). For example, the device may process the transaction data, the biometric data, and the card movement data, with the fraud detection model, to determine a fraud score associated with the transaction, as described above.

As further shown in FIG. 5, process 500 may include performing one or more actions based on the fraud score (block 560). For example, the device may perform one or more actions based on the fraud score, as described above.

Process 500 may include additional implementations, such as any single implementation or any combination of implementations described below and/or in connection with one or more other processes described elsewhere herein.

In a first implementation, performing the one or more actions may comprise one or more of: providing, to the transaction card, a notification authorizing the transaction when the fraud score fails to satisfy a threshold score; providing, to the transaction card, a notification declining the transaction when the fraud score satisfies the threshold score; or providing, to a client device of the user and based on the fraud score, a notification requesting user input that indicates whether the transaction is approved or unapproved by the user.

In a second implementation, alone or in combination with the first implementation, performing the one or more actions may comprise one or more of: providing the fraud score to a financial institution associated with the transaction card when the fraud score satisfies a threshold score; causing law enforcement to be dispatched to a location of the user when the fraud score satisfies the threshold score; or retraining the fraud detection model based on the fraud score.

In a third implementation, alone or in combination with one or more of the first and second implementations, processing the transaction data, the biometric data, and the card movement data may comprise one or more of: increasing the fraud score when the card movement data indicates that a hand of the user satisfies a shaking threshold during the transaction; or increasing the fraud score when the biometric data indicates that a heart rate of the user satisfies a heart rate threshold.

In a fourth implementation, alone or in combination with one or more of the first through third implementations, processing the transaction data, the biometric data, the transaction card data may comprise one or more of: refraining from increasing the fraud score when the transaction card data indicates that a hand of the user fails to satisfy a shaking threshold during the transaction; or refraining from increasing the fraud score when the biometric data indicates that a heart rate of the user fails to satisfy a heart rate threshold.

In a fifth implementation, alone or in combination with one or more of the first through fourth implementations, performing the one or more actions may comprise: determining whether the transaction is fraudulent based on the fraud score, and selectively: preventing the transaction based on the fraud score; or allowing the transaction based on the fraud score.

In a sixth implementation, alone or in combination with one or more of the first through fifth implementations, the transaction may be withdrawing money from an automated teller machine, and performing the one or more actions may comprise: determining that the fraud score satisfies a fraud threshold, and causing law enforcement to be dispatched to a location of the user based on determining that the fraud score satisfies the fraud threshold.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
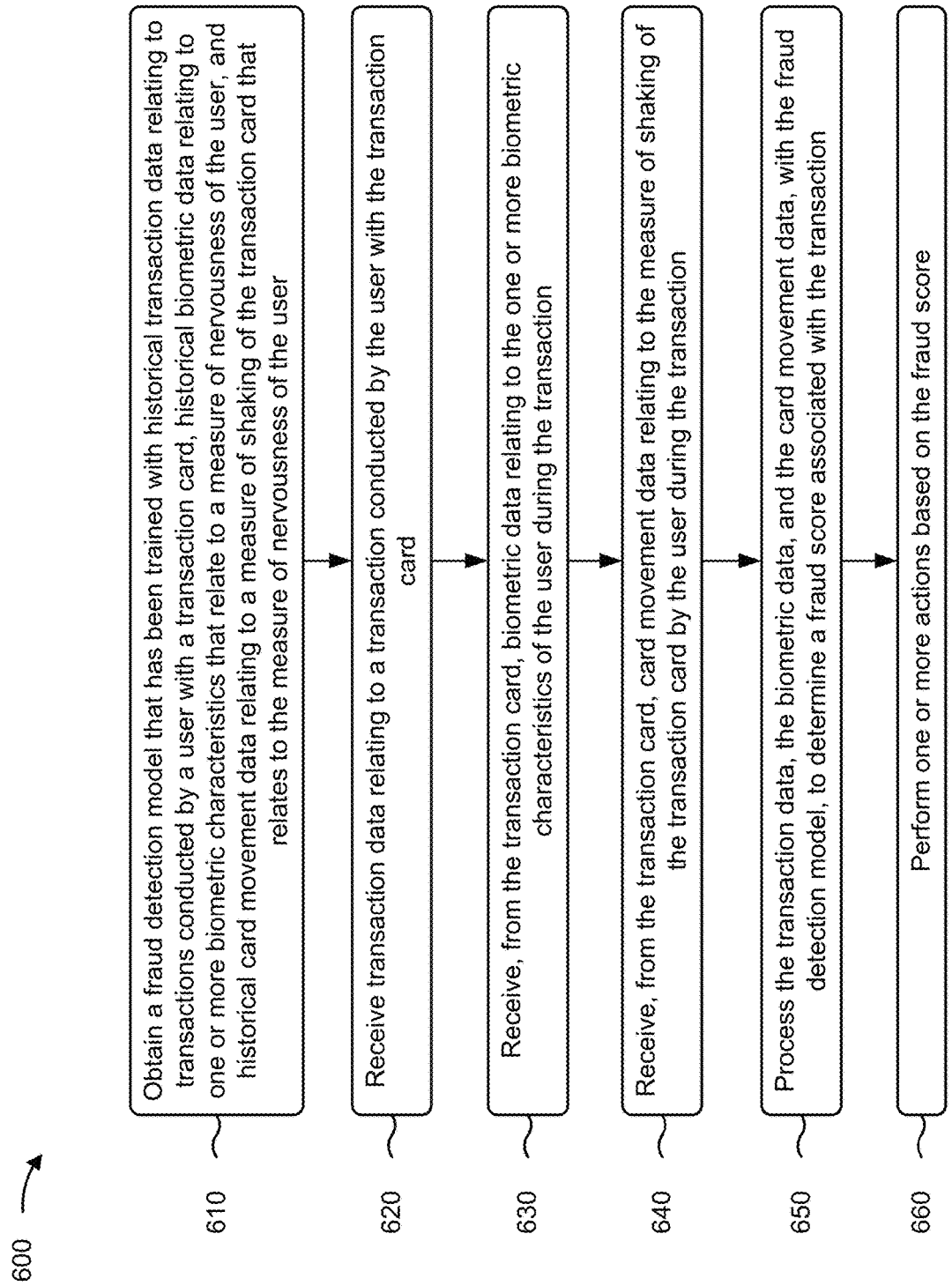

FIG. 6 is a flow chart of an example process 600 associated with utilizing card movement data to identify fraudulent transactions. In some implementations, one or more process blocks of FIG. 6 may be performed by a device (e.g., the fraud detection platform 301, the fraud detection platform 102). In some implementations, one or more process blocks of FIG. 6 may be performed by another device or a group of devices separate from or including the device, such as a transaction card (e.g., the transaction card 320, the transaction card 106), a transaction platform (e.g., the transaction platform 330, the transaction platform 108), a client device (e.g., the client device 340, the client device 110), and/or the like. Additionally, or alternatively, one or more process blocks of FIG. 6 may be performed by one or more components of a device 400, such as processor 420, memory 430, storage component 440, input component 450, output component 460, communication component 470, and/or the like.

As shown in FIG. 6, process 600 may include obtaining a fraud detection model that has been trained with historical transaction data relating to transactions conducted by a user with a transaction card, historical biometric data relating to one or more biometric characteristics that relate to a measure of nervousness of the user, and historical card movement data relating to a measure of shaking of the transaction card that relates to the measure of nervousness of the user (block 610). For example, the device may obtain a fraud detection model that has been trained with historical transaction data relating to transactions conducted by a user with a transaction card, historical biometric data relating to one or more biometric characteristics that relate to a measure of nervousness of the user, and historical card movement data relating to a measure of shaking of the transaction card that relates to the measure of nervousness of the user, as described above.

As further shown in FIG. 6, process 600 may include receiving transaction data relating to a transaction conducted by the user with the transaction card (block 620). For example, the device may receive transaction data relating to a transaction conducted by the user with the transaction card, as described above.

As further shown in FIG. 6, process 600 may include receiving, from the transaction card, biometric data relating to the one or more biometric characteristics of the user during the transaction (block 630). For example, the device may receive, from the transaction card, biometric data relating to the one or more biometric characteristics of the user during the transaction, as described above.

As further shown in FIG. 6, process 600 may include receiving, from the transaction card, card movement data relating to the measure of shaking of the transaction card by the user during the transaction (block 640). For example, the device may receive, from the transaction card, card movement data relating to the measure of shaking of the transaction card by the user during the transaction, as described above.

As further shown in FIG. 6, process 600 may include processing the transaction data, the biometric data, and the card movement data, with the fraud detection model, to determine a fraud score associated with the transaction (block 650). For example, the device may process the transaction data, the biometric data, and the card movement data, with the fraud detection model, to determine a fraud score associated with the transaction, as described above.

As further shown in FIG. 6, process 600 may include performing one or more actions based on the fraud score (block 660). For example, the device may perform one or more actions based on the fraud score, as described above.

Process 600 may include additional implementations, such as any single implementation or any combination of implementations described below and/or in connection with one or more other processes described elsewhere herein.

In a first implementation, the one or more biometric characteristics may include one or more of: a heart rate of the user, a perspiration level of the user, a rate of breathing of the user, or a shaky voice level of the user.

In a second implementation, alone or in combination with the first implementation, the fraud detection model may include one or more of: a logistic regression model, a decision tree model, a random forest model, or a neural network model.

In a third implementation, alone or in combination with one or more of the first and second implementations, process 600, when processing the transaction data, the biometric data, and the card movement data, may include one or more of: increasing the fraud score when the card movement data indicates that a hand of the user satisfies a shaking threshold during the transaction; or refraining from increasing the fraud score when the card movement data indicates that the hand of the particular user fails to satisfy the shaking threshold during the transaction.

In a fourth implementation, alone or in combination with one or more of the first through third implementations, the fraud detection model may be configured to generate a higher score for the fraud detection score when the one or more biometric characteristics satisfy a biometric threshold and the card movement data satisfies a card movement threshold than when the one or more biometric characteristics fail to satisfy the biometric threshold or the card movement data fails to satisfy the card movement threshold.

In a fifth implementation, alone or in combination with one or more of the first through fourth implementations, the fraud detection model may be configured to generate a higher score for the fraud detection score when the measure of nervousness satisfies a nervousness threshold than when the measure of nervousness fails to satisfy the nervousness threshold.

In a sixth implementation, alone or in combination with one or more of the first through fifth implementations, the fraud detection model may be configured to generate a higher score for the fraud detection score when the transaction data is indicative of fraudulent activity, the one or more biometric characteristics satisfy a biometric threshold, and the card movement data satisfies a card movement threshold than when the transaction data is not indicative of fraudulent activity, the one or more biometric characteristics fail to satisfy the biometric threshold, or the card movement data fails to satisfy the card movement threshold.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Figure 7:
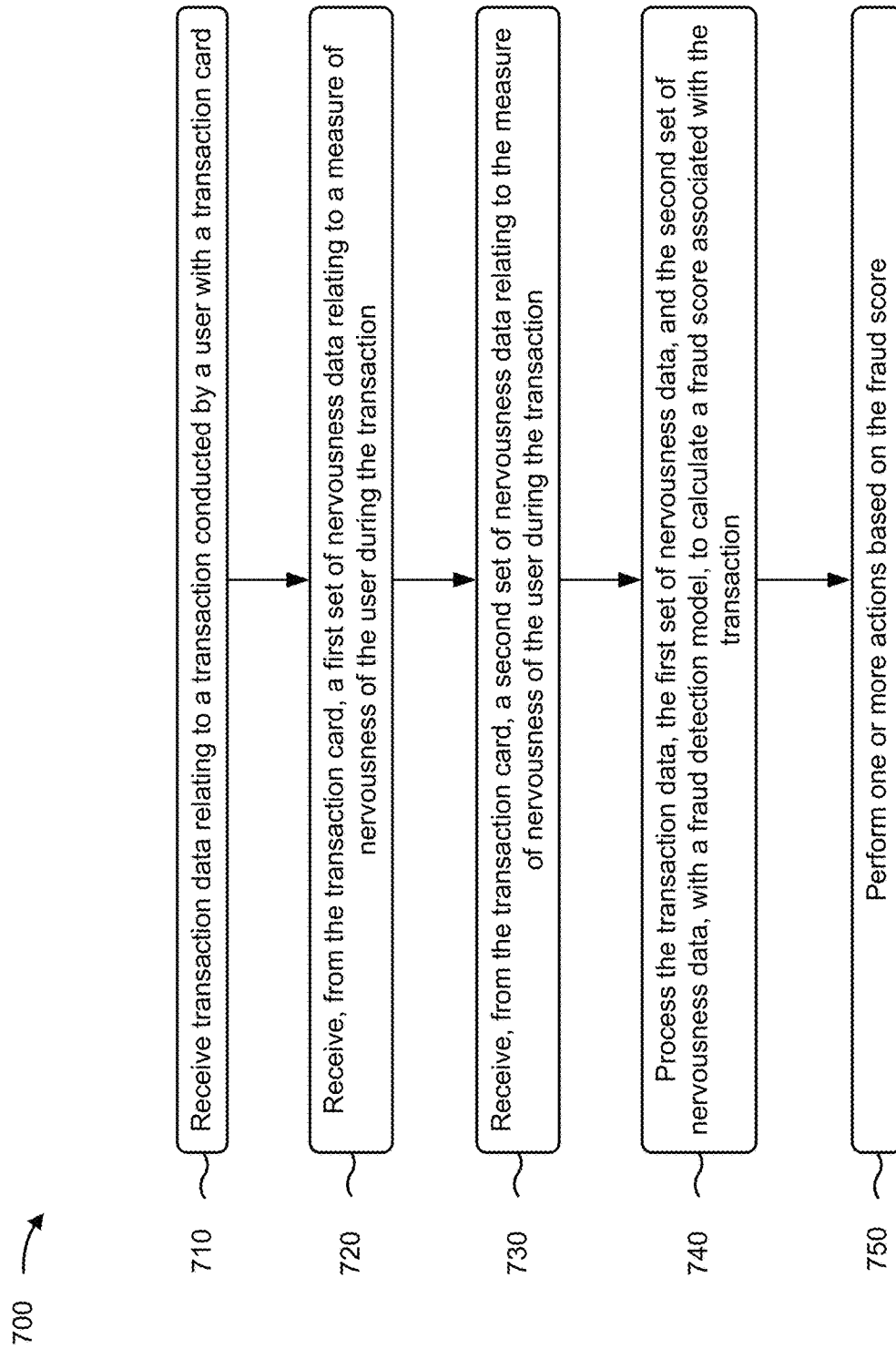

FIG. 7 is a flow chart of an example process 700 associated with utilizing card movement data to identify fraudulent transactions. In some implementations, one or more process blocks of FIG. 7 may be performed by a device (e.g., the fraud detection platform 301, the fraud detection platform 102). In some implementations, one or more process blocks of FIG. 7 may be performed by another device or a group of devices separate from or including the device, such as a transaction card (e.g., the transaction card 320, the transaction card 106), a transaction platform (e.g., the transaction platform 330, the transaction platform 108), a client device (e.g., the client device 340, the client device 110), and/or the like. Additionally, or alternatively, one or more process blocks of FIG. 7 may be performed by one or more components of a device 400, such as processor 420, memory 430, storage component 440, input component 450, output component 460, communication component 470, and/or the like.

As shown in FIG. 7, process 700 may include receiving transaction data relating to a transaction conducted by a user with a transaction card (block 710). For example, the device may receive transaction data relating to a transaction conducted by a user with a transaction card, as described above.

As further shown in FIG. 7, process 700 may include receiving, from the transaction card, a first set of nervousness data relating to a measure of nervousness of the user during the transaction (block 720). For example, the device may receive, from the transaction card, a first set of nervousness data relating to a measure of nervousness of the user during the transaction, as described above.

As further shown in FIG. 7, process 700 may include receiving, from the transaction card, a second set of nervousness data relating to the measure of nervousness of the user during the transaction (block 730). For example, the device may receive, from the transaction card, a second set of nervousness data relating to the measure of nervousness of the user during the transaction, as described above.

As further shown in FIG. 7, process 700 may include processing the transaction data, the first set of nervousness data, and the second set of nervousness data, with a fraud detection model, to calculate a fraud score associated with the transaction (block 740). For example, the device may process the transaction data, the first set of nervousness data, and the second set of nervousness data, with a fraud detection model, to calculate a fraud score associated with the transaction, as described above.

As further shown in FIG. 7, process 700 may include performing one or more actions based on the fraud score (block 750). For example, the device may perform one or more actions based on the fraud score, as described above. In some implementations, the one or more actions comprise: providing, to the transaction card, a notification authorizing the transaction when the fraud score fails to satisfy a threshold score, providing, to the transaction card, a notification declining the transaction when the fraud score satisfies the threshold score, providing, to a client device of the user, a notification when the fraud score satisfies the threshold score, providing the fraud score to a financial institution associated with the transaction card when the fraud score satisfies a threshold score, causing law enforcement to be dispatched to a location of the user when the fraud score satisfies the threshold score, or retraining the fraud detection model based on the fraud score.

Process 700 may include additional implementations, such as any single implementation or any combination of implementations described below and/or in connection with one or more other processes described elsewhere herein.

In a first implementation, processing the transaction data, the first set of nervousness data, and the second set of nervousness data may include one or more of: increasing the fraud score when the first set of nervousness data indicates that a hand of the user satisfies a shaking threshold during the transaction; increasing the fraud score when the second set of nervousness data indicates that a heart rate of the user satisfies a heart rate threshold during the transaction; refraining from increasing the fraud score when the first set of nervousness data indicates that the hand of the user fails to satisfy the shaking threshold during the transaction; or refraining from increasing the fraud score when the second set of nervousness data indicates that the heart rate of the user fails to satisfy the heart rate threshold during the transaction.

In a second implementation, alone or in combination with the first implementation, processing the transaction data, the first set of nervousness data, and the second set of nervousness data may include one or more of: increasing the fraud score when the first set of nervousness data indicates that a hand of the user satisfies a shaking threshold during the transaction; or refraining from increasing the fraud score when the first set of nervousness data indicates that the hand of the user fails to satisfy the shaking threshold during the transaction.

In a third implementation, alone or in combination with one or more of the first and second implementations, the first set of nervousness data may include biometric data relating to one or more biometric characteristics during the transaction; the second set of nervousness data may include card movement data relating to a measure of shaking of the transaction card during the transaction, and the fraud detection model may be configured to generate a higher score for the fraud detection score when the one or more biometric characteristics satisfy a biometric threshold and the card movement data satisfies a card movement threshold than when the one or more biometric characteristics fail to satisfy the biometric threshold or the card movement data fails to satisfy the card movement threshold.

In a fourth implementation, alone or in combination with one or more of the first through third implementations, the one or more biometric characteristics may include one or more of: a heart rate of the user, a perspiration level of the user, a rate of breathing of the user, or a shaky voice level of the user.

In a fifth implementation, alone or in combination with one or more of the first through fourth implementations, the fraud detection model may be configured to generate a higher score for the fraud detection score when the measure of nervousness satisfies a nervousness threshold than when the measure of nervousness fails to satisfy the nervousness threshold.

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

Some implementations are described herein in connection with thresholds. As used herein, satisfying a threshold may depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, etc., depending on the context.

Certain user interfaces have been described herein and/or shown in the figures. A user interface may include a graphical user interface, a non-graphical user interface, a text-based user interface, and/or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A first device, comprising:
one or more processors configured to:
receive first data associated with a transaction conducted by a user associated with a second device;
receive, from the second device, a set of second data associated with behavioral data of the user during the transaction;
receive, from the second device, a set of third data relating to the behavioral data during the transaction,
wherein the set of second data and the set of third data are associated with at least one of biometric data or movement data associated with the second device;
process the first data, the set of second data, and the set of third data, with a fraud detection model, to calculate a fraud score associated with the transaction; and
perform one or more actions based on determining whether the fraud score satisfies a threshold score, wherein the one or more actions comprise at least one of:
providing a notification that the fraud score satisfies the threshold score,
providing a notification authorizing or declining the transaction,
providing the fraud score to a financial institution associated with the second device,
prohibiting the transaction, or
retraining the fraud detection model based on the fraud score.

2. The first device of claim 1, wherein the one or more processors are further configured to:
train, based on historical transaction data relating to transactions conducted by the user, and based on historical biometric data relating to one or more biometric characteristics that relate to behavioral data, the fraud detection model.

3. The first device of claim 1, wherein the second device comprises a biometric sensor and an accelerometer.

4. The first device of claim 1, wherein the one or more processors are further configured to:
modify the fraud score based on determining whether the set of second data satisfies a first threshold value during the transaction,
wherein the set of second data is associated with the behavioral data related to movement of the user; and
modify the fraud score based on determining whether the set of third data satisfies a second threshold value during the transaction,
wherein the set of third data is associated with biometric data related to the user.

5. The first device of claim 1, wherein the set of second data is associated with at least one of:
a heart rate of the user,
a perspiration level of the user,
a rate of breathing of the user, or
a shaky voice level of the user.

6. The first device of claim 1, wherein the one or more processors are further configured to:
provide a request for input indicating whether the transaction is approved or unapproved; and
retrain the fraud detection model based on input received in response to the request for input.

7. A method, comprising:
receiving, by a first device, first data associated with a transaction conducted by a user associated with a second device;
receiving, by the first device and from the second device, a set of second data associated with behavioral data of the user during the transaction;
receiving, by the first device and from the second device, a set of third data relating to the behavioral data during the transaction,
wherein the set of second data and the set of third data are associated with at least one of biometric data or movement data associated with the second device;
processing, by the first device, the first data, the set of second data, and the set of third data, with a fraud detection model, to calculate a fraud score associated with the transaction; and
performing, by the first device, one or more actions based on determining whether the fraud score satisfies a threshold score, wherein the one or more actions comprise at least one of:
providing a notification that the fraud score satisfies the threshold score,
providing a notification authorizing or declining the transaction,
providing the fraud score to a financial institution associated with the second device,
prohibiting the transaction, or
retraining the fraud detection model based on the fraud score.

8. The first device of claim 1, wherein the one or more actions further comprise:
updating the fraud detection model based on user input.

9. The method of claim 7, further comprising:
training, based on historical transaction data relating to transactions conducted by the user, and based on historical biometric data relating to one or more biometric characteristics that relate to behavioral data, the fraud detection model.

10. The method of claim 7, wherein the second device comprises a biometric sensor and an accelerometer.

11. The method of claim 7, further comprising:
modifying the fraud score based on determining whether the set of second data satisfies a first threshold value during the transaction,
wherein the set of second data is associated with the behavioral data related to movement of the user; and
modifying the fraud score based on determining whether the set of third data satisfies a second threshold value during the transaction.

12. The first device of claim 7, wherein the set of second data is associated with at least one of:
a heart rate of the user,
a perspiration level of the user,
a rate of breathing of the user, or
a shaky voice level of the user.

13. The first device of claim 7, further comprising:
providing a request for input indicating whether the transaction is approved or unapproved; and
retraining the fraud detection model based on input received in response to the request for input.

14. The method of claim 7, wherein the one or more actions further comprise:
updating the fraud detection model based on user input.

15. A non-transitory computer-readable medium storing a set of instructions, the set of instructions comprising:
one or more instructions that, when executed by one or more processors of a first device, cause the first device to:
receive first data associated with a transaction conducted by a user associated with a second device;
receive, from the second device, a set of second data associated with behavioral data of the user during the transaction;
receive, from the second device, a set of third data relating to the behavioral data during the transaction, wherein the set of second data and the set of third data are associated with at least one of biometric data or movement data associated with the second device;
process the first data, the set of second data, and the set of third data, with a fraud detection model, to calculate a fraud score associated with the transaction; and
perform one or more actions based on determining whether the fraud score satisfies a threshold score, wherein the one or more actions comprise at least one of:
providing a notification that the fraud score satisfies the threshold score,
providing a notification authorizing or declining the transaction,
providing the fraud score to a financial institution associated with the second device,
prohibiting the transaction, or
retraining the fraud detection model based on the fraud score.

16. The non-transitory computer-readable medium of claim 15, wherein the one or more instructions further cause the first device to:
train, based on historical transaction data relating to transactions conducted by the user, and based on historical biometric data relating to one or more biometric characteristics that relate to behavioral data, the fraud detection model.

17. The non-transitory computer-readable medium of claim 15, wherein the second device comprises a biometric sensor and an accelerometer.

18. The non-transitory computer-readable medium of claim 15, wherein the one or more instructions further cause the first device to:
modify the fraud score based on determining whether the set of second data satisfies a first threshold value during the transaction,
wherein the set of second data is associated with the behavioral data related to movement of the user; and
modify the fraud score based on determining whether the set of third data satisfies a second threshold value during the transaction,
wherein the set of third data is associated with biometric data related to the user.

19. The non-transitory computer-readable medium of claim 15, wherein the one or more instructions further cause the first device to:
provide a request for input indicating whether the transaction is approved or unapproved; and
retrain the fraud detection model based on input received in response to the request for input.

20. The non-transitory computer-readable medium of claim 15, wherein the one or more actions further comprise:
updating the fraud detection model based on user input.

* * * * *